United States Patent
Hasegawa et al.

(10) Patent No.: US 10,269,305 B2
(45) Date of Patent: Apr. 23, 2019

(54) MIRROR DISPLAY

(71) Applicant: Sharp Kabushiki Kaisha, Osaka (JP)

(72) Inventors: Masahiro Hasegawa, Osaka (JP); Hiroyuki Hakoi, Osaka (JP); Akira Sakai, Osaka (JP); Hidefumi Yoshida, Osaka (JP); Takaharu Kanai, Osaka (JP); Takako Shimizu, Osaka (JP); Yuuki Itou, Osaka (JP); Atsushi Ogawa, Osaka (JP); Akira Tsuruta, Osaka (JP); Takayuki Yuasa, Osaka (JP); Shigeaki Mizushima, Osaka (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 315 days.

(21) Appl. No.: 15/114,564

(22) PCT Filed: Aug. 29, 2014

(86) PCT No.: PCT/JP2014/072709
§ 371 (c)(1),
(2) Date: Jul. 27, 2016

(87) PCT Pub. No.: WO2015/114865
PCT Pub. Date: Aug. 6, 2015

(65) Prior Publication Data
US 2016/0343308 A1    Nov. 24, 2016

(30) Foreign Application Priority Data
Jan. 28, 2014   (JP) ................................. 2014-013410

(51) Int. Cl.
*G09G 3/34*    (2006.01)
*G09G 3/36*    (2006.01)
(Continued)

(52) U.S. Cl.
CPC ......... *G09G 3/3413* (2013.01); *G02F 1/1336* (2013.01); *G02F 1/133308* (2013.01);
(Continued)

(58) Field of Classification Search
CPC ............. G02F 1/133308; G02F 1/1335; G02F 1/133504; G02F 1/133512;
(Continued)

(56) References Cited

U.S. PATENT DOCUMENTS

2004/0051827 A1    3/2004 Hinata et al.
2008/0030644 A1    2/2008 Ukawa et al.
(Continued)

FOREIGN PATENT DOCUMENTS

JP    2004-184491 A    7/2004
JP    2004-212782 A    7/2004
(Continued)

*Primary Examiner* — Robert J Michaud
(74) *Attorney, Agent, or Firm* — ScienBiziP, P.C.

(57) ABSTRACT

The present invention provides a mirror display that has improved design aesthetics and makes it possible to sufficiently improve visibility in mirror mode in dark environments. The mirror display according to the present invention includes a half mirror plate having a half mirror layer, a display device, a case, and an auxiliary illumination unit that includes an auxiliary light source. The case supports at least the half mirror plate and the display device and includes an outer frame that covers an edge of a front surface of the half mirror plate when viewed in a plan view from a viewing side. The display device is arranged on a rear side of the half mirror plate. The auxiliary light source is arranged on the rear side of the half mirror plate, the display device, or the outer frame. The auxiliary illumination unit is controlled separately from the display device and emits light towards the viewing side when the mirror display is in mirror mode. As measured on the viewing side, a brightness of the light emitted from the auxiliary illumination unit is greater than a (Continued)

brightness of the display device when the display device is in a white display state.

25 Claims, 33 Drawing Sheets

(51) Int. Cl.
    *G02F 1/1333*     (2006.01)
    *G02F 1/1335*     (2006.01)
    *G02F 1/13357*     (2006.01)
    *G02F 1/13363*     (2006.01)
    *G02F 1/1368*     (2006.01)

(52) U.S. Cl.
    CPC .. *G02F 1/133504* (2013.01); *G02F 1/133512* (2013.01); *G02F 1/133514* (2013.01); *G02F 1/133536* (2013.01); *G02F 1/133555* (2013.01); *G02F 1/133621* (2013.01); *G09G 3/36* (2013.01); *G02F 1/1368* (2013.01); *G02F 1/13363* (2013.01); *G02F 2001/133302* (2013.01); *G02F 2001/133548* (2013.01); *G02F 2001/133557* (2013.01); *G02F 2001/133616* (2013.01); *G02F 2001/133638* (2013.01); *G02F 2413/01* (2013.01); *G02F 2413/05* (2013.01); *G09G 2300/04* (2013.01); *G09G 2320/0626* (2013.01); *G09G 2320/0666* (2013.01); *G09G 2360/145* (2013.01)

(58) Field of Classification Search
    CPC ... G02F 2001/133553; G02F 1/133536; G02F 2001/133557; G09G 3/3413; G06F 1/1601
    See application file for complete search history.

(56) References Cited

U.S. PATENT DOCUMENTS

| | | | |
|---|---|---|---|
| 2009/0097252 A1* | 4/2009 | Liou | F21S 6/003 362/269 |
| 2014/0146093 A1* | 5/2014 | Sako | G09G 3/3406 345/690 |

FOREIGN PATENT DOCUMENTS

| | | |
|---|---|---|
| JP | 2005-167322 A | 6/2005 |
| JP | 2005-321717 A | 11/2005 |
| JP | 4211341 B2 | 1/2009 |
| JP | 4645634 B2 | 3/2011 |
| JP | 2012-191308 A | 10/2012 |
| JP | 2013-255687 A | 12/2013 |

\* cited by examiner

MIRROR DISPLAY

TECHNICAL FIELD

The present invention relates to a mirror display. More particularly, the present invention relates to a mirror display that has both a mirror mode in which the mirror display functions as a mirror and a display mode in which the mirror display displays an image.

BACKGROUND ART

In recent years, mirror displays in which a half mirror plate that includes a half mirror layer is arranged on the front surface of a display device so that the mirror display can function as a mirror when no images are being displayed have been developed for use in applications such as digital signage (see Patent Document 1, for example). These mirror displays can be used as mirrors in addition to being used for the original intended purpose as displays. In other words, in these types of mirror displays, while the display device is emitting display light, images are displayed using that display light in the region from which the display device emits the display light. Meanwhile, while the display device is not emitting display light, the region from which the display device is not emitting display light functions as a mirror due to the reflection of external light off of that region.

Examples of well-known materials suitable for use as the half mirror layer include deposited metal films, dielectric multilayer films, and the like. Furthermore, mirror displays in which a reflective polarizer is used as the half mirror layer in order to make it possible to improve the visibility of the image in the bright region of the mirror display while in display mode have also been developed (see Patent Document 2, for example). Well-known examples of such reflective polarizers include multilayer reflective polarizers, cholesteric liquid crystals used in combination with a quarter-wave plate, wire-grid reflective polarizers, and the like. One example of such a multilayer reflective polarizer is a Sumitomo 3M reflective polarizer (product name: DBEF). One example of a reflective polarizer in which cholesteric liquid crystals are used in combination with a quarter-wave plate is a Nitto Denko Corporation reflective polarizer (product name: NIPOCS).

In mirror display applications, it is often difficult to achieve sufficient visibility when the mirror display is used as a mirror in dark environments because the mirror display must reflect external light in order to function as a mirror. Moreover, even in mirror displays in which a reflective polarizer is used as the half mirror layer, it is difficult to achieve a reflectance equal to or greater than that of a normal mirror when the mirror display is used in mirror mode simply due to the principle by which mirror mode works. Therefore, there is strong demand for improved visibility of reflected images in mirror mode in these types of mirror displays, with poor visibility of reflected images in dark environments being a problem of particular significance. To solve this problem, mirror displays that include an auxiliary illumination unit in order to illuminate reflected objects (such as an onlooker's face) when in mirror mode have been developed (see Patent Documents 3 to 5, for example).

RELATED ART DOCUMENTS

Patent Documents

Patent Document 1: Japanese Patent No. 4645634
Patent Document 2: Japanese Patent No. 4211341
Patent Document 3: Japanese Patent Application Laid-Open Publication No. 2004-184491
Patent Document 4: Japanese Patent Application Laid-Open Publication No. 2005-321717
Patent Document 5: Japanese Patent Application Laid-Open Publication No. 2004-212782

SUMMARY OF THE INVENTION

Problems to be Solved by the Invention

However, in configurations that include an auxiliary illumination unit, the auxiliary illumination unit itself tends to be visible. In particular, the overall design aesthetic suffers the most when the light source of the auxiliary illumination unit is visible. Furthermore, in some cases, the brightness of the auxiliary illumination unit is not sufficient, and the visibility of reflected images in mirror mode in dark environments is still not sufficiently improved.

One possible solution to improving the visibility of reflected images in mirror mode in dark environments would be to use a completely separate electric lamp or the like as the auxiliary illumination unit, for example. In this case, however, a mounting location and power supply other than those used for the mirror display must be allocated for the auxiliary illumination unit. Moreover, because the auxiliary illumination unit tends to be very visible, the design aesthetics and other aspects of the commercial value of the overall mirror display are negatively affected.

Patent Document 3 discloses a display device that has both a display mode and a mirror mode and makes it possible to produce bright reflected images even in dark environments. However, in the invention disclosed in Patent Document 3, the auxiliary illumination unit is arranged outside of the periphery of a half mirror plate and is easily visible. This represents an area where there is still room for improvement in terms of design aesthetics.

Patent Document 4 discloses a display device that can be used as a mirror even in dimly lit environments. However, in the invention disclosed in Patent Document 4, as the invention disclosed in Patent Document 3, the auxiliary illumination unit is easily visible, therefore representing an area where there is still room for improvement in terms of design aesthetics.

Patent Document 5 discloses a display device that can be switched between display mode and mirror mode and makes it possible to improve display quality as well as make the overall display device lighter and thinner. However, in the invention disclosed in Patent Document 5, the auxiliary illumination unit uses display light provided by the display device when the display device is in a white display state. Therefore, when the brightness of the mirror display is measured, the brightness of the light emitted from the auxiliary illumination unit towards the viewing side is never greater than the brightness of the display device when in the white display state. As a result, there is still room for improvement in terms of more sufficiently improving visibility in mirror mode in dark environments.

The present invention was made in light of the foregoing and aims to provide a mirror display that has improved design aesthetics and also makes it possible to sufficiently improve visibility in mirror mode in dark environments.

Means for Solving the Problems

The inventors conducted various research on mirror displays with improved design aesthetics that could also make it possible to sufficiently improve visibility in mirror mode in dark environments, focusing in particular on (1) configurations in which the light source of the auxiliary illumination unit is not easily visible, and (2) configurations in which the brightness of light emitted from the light source of the auxiliary illumination unit is greater than the brightness of the display device when in the white display state (as measured on the viewing side of the mirror display). The inventors found that building the light source of the auxiliary illumination unit into the mirror display and reducing the visibility of the light source from the viewing side made it possible to satisfy condition (1). The inventors also found that arranging an auxiliary illumination unit that is controlled separately from the display device or modifying the structure of part of the display device made it possible to satisfy condition (2). The inventors predicted that this could effectively solve the abovementioned problems and arrived at the present invention.

In other words, one aspect of the present invention is a mirror display (a first mirror display), including: a half mirror plate including a half mirror layer; a display device; a case; and an auxiliary illumination unit including an auxiliary light source, wherein the case supports at least the half mirror plate and the display device and includes an outer frame that covers an edge of a front surface of the half mirror plate when viewed in a plan view from a viewing side, wherein the display device is arranged on a rear side of the half mirror plate, wherein the auxiliary light source is arranged on the rear side of the half mirror plate, the display device, or the outer frame, wherein the display device emits display light, and the mirror display is switchable between a display mode in which the display light passes through the half mirror plate and a mirror mode in which the display device does not emit the display light, wherein the auxiliary illumination unit is controlled separately from the display device and emits light towards the viewing side when the mirror display is in the mirror mode, and wherein, as measured on the viewing side of the mirror display, a brightness of the light emitted from the auxiliary illumination unit is greater than a brightness of the display device when the display device is in a white display state.

Moreover, another aspect of the present invention is a mirror display (a second mirror display), including: a half mirror plate that includes a half mirror layer; and a display device, wherein the display device emits display light, and the mirror display is switchable between a display mode in which the display light passes through the half mirror plate and a mirror mode in which the display device does not emit the display light, wherein the display device includes an auxiliary illumination unit that is arranged on the rear side of the half mirror plate and that emits light towards a viewing side when the mirror display is in the mirror mode, and wherein, as measured on the viewing side of the mirror display, a brightness of the light emitted from the auxiliary illumination unit is greater than a brightness of the display device when the display device is in a white display state.

Effects of the Invention

The present invention makes it possible to provide a mirror display that has improved design aesthetics and makes it possible to sufficiently improve visibility in mirror mode in dark environments.

DETAILED DESCRIPTION OF EMBODIMENTS

Embodiments of the present invention will be described in detail below with reference to figures. However, the present invention is not limited only to these embodiments. Moreover, aspects of the configurations of each embodiment may be combined or modified as appropriate within the spirit of the present invention.

In the embodiments described below, a liquid crystal display device is used as the display device. However, the type of display device used is not particularly limited. For example, a plasma display device, an organic electroluminescent display device, an inorganic electroluminescent display device, or the like may be used instead.

(Embodiment 1)

Embodiment 1 relates to a first mirror display according to the present invention. In Embodiment 1, an auxiliary illumination unit includes an auxiliary light source and a light guide plate arranged on the rear side of an outer frame. Moreover, Embodiment 1 relates to a configuration in which the size of the liquid crystal display device is the same as the size of a half mirror plate when viewed in a plan view from the viewing side.

Figure 1:
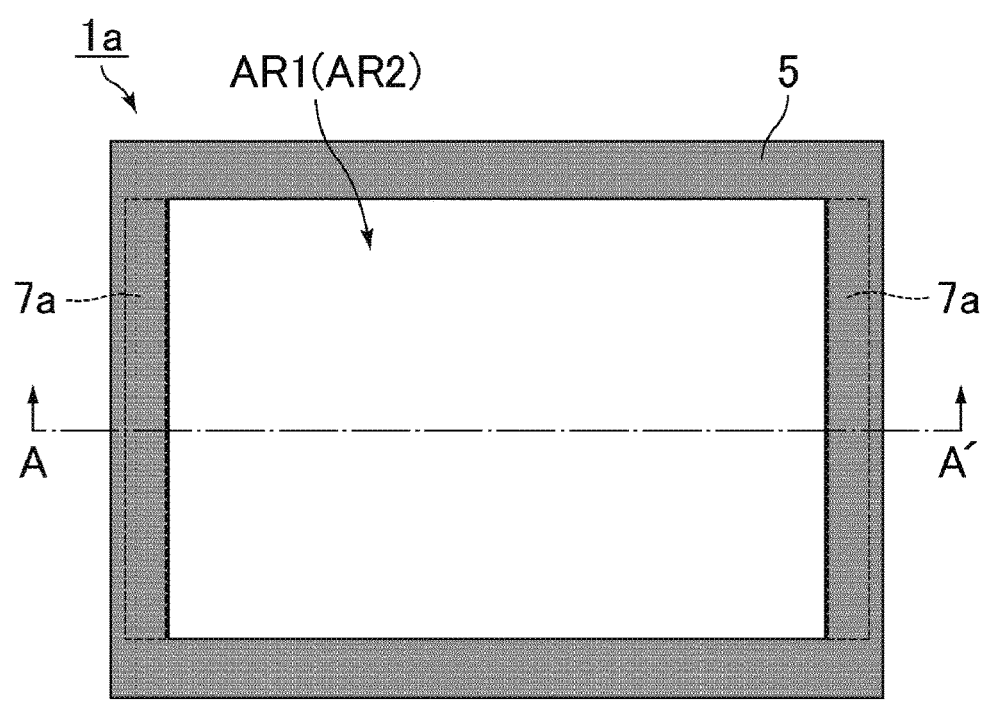
FIG. 1 is a plan view schematically illustrating a mirror display according to Embodiment 1.

FIG. 1 is a plan view schematically illustrating the mirror display according to Embodiment 1. As illustrated in FIG. 1, a mirror display 1a includes, in a region surrounded by a case 5, a display region AR1 that functions as an image display surface when the mirror display 1a is in a display mode and a mirror region AR2 that functions as a mirror surface when the mirror display 1a is in a mirror mode. The display region AR1 and the mirror region AR2 are the same size. Auxiliary illumination units 7a are arranged behind the case 5 along two opposing sides of the display region AR1 (mirror region AR2). In FIG. 1, the auxiliary illumination units 7a are arranged along two sides, but the auxiliary illumination units 7a may also be arranged along just one side or along three or more sides. Moreover, the auxiliary illumination units 7a are not limited to being arranged along the two opposing left and right sides of the display region AR1 (mirror region AR2) and may be arranged along any of the four top, bottom, left, or right sides of the display region AR1 (mirror region AR2).

Figure 2:
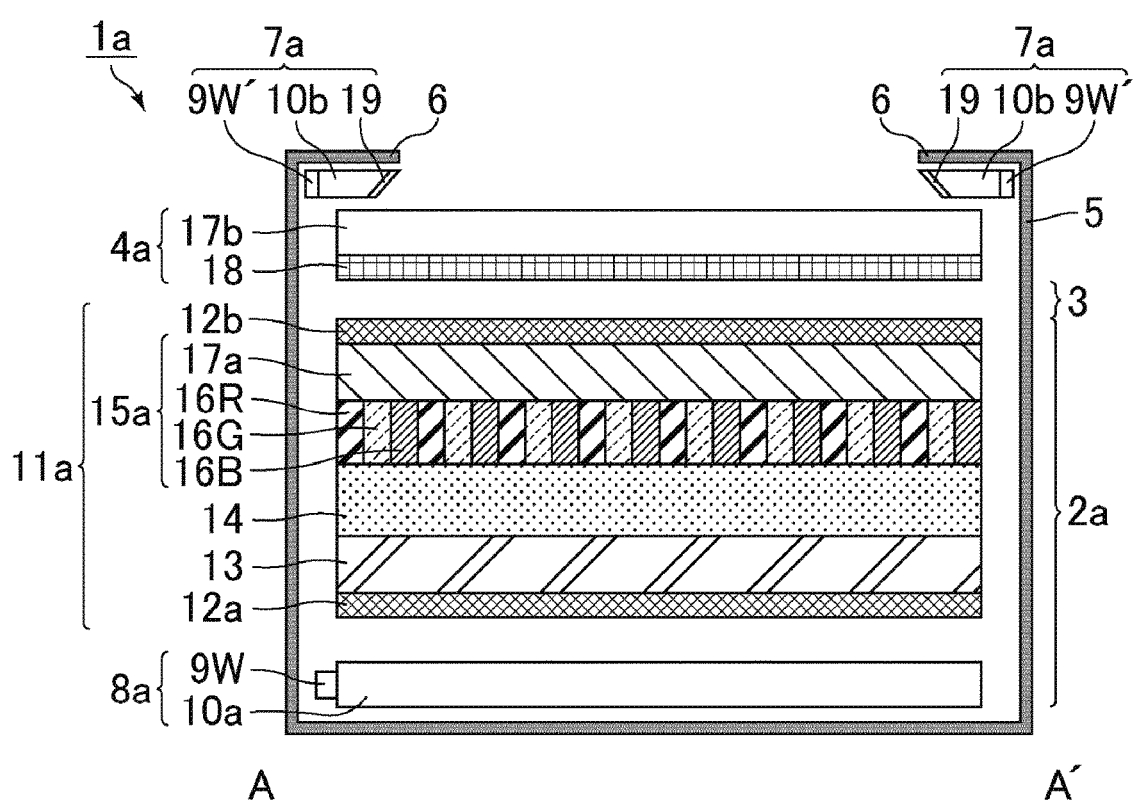
FIG. 2 is a cross-sectional view schematically illustrating a cross section taken along line A-A' in FIG. 1.

FIG. 2 is a cross-sectional view schematically illustrating a cross section taken along line A-A' in FIG. 1. As illustrated in FIG. 2, the mirror display 1a includes a liquid crystal display device 2a, an air space 3, and a half mirror plate 4a arranged in that order from the rear side to the viewing side. The mirror display 1a also includes the case 5 that supports the liquid crystal display device 2a and the half mirror plate 4a, as well as the auxiliary illumination units 7a that are arranged along the periphery of the half mirror plate 4a at the positions indicated in FIG. 1. The size of the liquid crystal display device 2a is the same as the size of the half mirror plate 4a when viewed in a plan view from the viewing side. The liquid crystal display device 2a and the half mirror plate 4a are fixed together by a pair of aluminum rails that are attached in a frame shape to the top and bottom edges of the liquid crystal display device 2a and engage with the top and bottom edges of the half mirror plate 4a. The air space 3 is a small gap formed between the liquid crystal display device 2a and the half mirror plate 4a. In the present specification, the term "viewing surface" refers to the surface on the half mirror plate side of the mirror display, and the term "viewing side" refers to the top side of the mirror display 1a in FIG. 2. Moreover, the term "rear surface" refers to the surface on the opposite side of the mirror display to the viewing surface, and the term "rear side" refers to the bottom side of the mirror display 1a in FIG. 2. Furthermore, the term "front surface" also refers to the viewing side surface. These terminology conventions apply to all of the embodiments.

The liquid crystal display device 2a includes a backlight unit 8a and a liquid crystal display panel 11a arranged in that order from the rear side to the viewing side.

The backlight unit 8a is an edge-lit backlight device that includes a light guide plate 10a and white light-emitting diodes (LEDs) 9W that are arranged along an edge of the light guide plate 10a and function as the display light source. The light guide plate 10a is made from an acrylic resin. The LEDs 9W are constituted by an LED backlight unit of the type used in Sharp Corporation liquid crystal televisions (such as the LC-20F5-B).

The liquid crystal display panel 11a includes an absorptive polarizer 12a, a thin-film transistor array substrate 13, a liquid crystal layer 14, a color filter substrate 15a, and an absorptive polarizer 12b that are arranged in that order from the rear side to the viewing side. The liquid crystal display panel 11a is a vertical-alignment (VA) display mode panel. The display mode of the liquid crystal display panel 11a is not particularly limited, and a twisted nematic (TN) panel, an in-plane switching (IPS) panel, a fringe field switching (FFS) panel, or the like may also be used, for example. It is preferable that the display region display a black screen while in mirror mode. Moreover, in consideration of power consumption, it is preferable that no voltage be applied to the liquid crystal display device while in mirror mode, and therefore it is preferable that a panel of a normally black display mode (that is, one that displays a black screen when no voltage is applied, such as a VA, IPS, or FFS mode panel, for example) be used. The liquid crystal display panel 11a is an active matrix-driven panel. However, the drive method of the liquid crystal display panel 11a is not particularly limited, and a static drive method, simple matrix drive method, or the like may also be used.

In the thin-film transistor array substrate 13, the leads of a plurality of thin-film transistor elements or the like (not illustrated in the figure) are arranged on top of a glass substrate. Any transparent substrate such as a plastic substrate or the like may be used in place of the glass substrate. The semiconductor layers of the thin-film transistor elements are made from amorphous silicon. However, the semiconductor layers are not particularly limited to this configuration and may instead be made from a low temperature polysilicon material, an oxide semiconductor material, or the like. Examples of oxide semiconductor materials that can be used include compounds made from indium, gallium, zinc, and oxygen; compounds made from indium, zinc, and oxygen; and the like. Compounds made from indium, gallium, zinc, and oxygen exhibit low off-leakage currents, and therefore using such a compound for the oxide semiconductor material makes it possible to implement an idling stop drive scheme in which once a voltage is applied to each element, those elements retain their voltage states until the next time data is written. Therefore, from a power consumption perspective, it is preferable that a compound made from indium, gallium, zinc, and oxygen be used for the oxide semiconductor material.

The color filter substrate 15a includes a glass substrate 17a and color filter layers 16R (red), 16G (green), and 16B (blue) that are arranged on the thin-film transistor array substrate 13 side of the glass substrate 17a. Any transparent substrate such as a plastic substrate or the like may be used in place of the glass substrate 17a. Moreover, the combination of colors used in the color filter layers is not particularly limited, and a combination of red, green, blue, and yellow color filter layers may be used instead, for example.

The liquid crystal layer 14 is sandwiched between the thin-film transistor array substrate 13 and the color filter substrate 15*a*, and the thin-film transistor array substrate 13 and the color filter substrate 15*a* are fixed together using a sealing material (not illustrated in the figure).

The absorptive polarizer 12*a* is fixed to the rear side of the thin-film transistor array substrate 13 using an adhesive (not illustrated in the figure). The absorptive polarizer 12*b* is fixed to the viewing side of the color filter substrate 15*a* using an adhesive (not illustrated in the figure). The absorptive polarizers 12*a* and 12*b* are arranged such that the absorption axes thereof are orthogonal to one another.

The half mirror plate 4*a* includes, arranged in order from the rear side to the viewing side, a reflective polarizer 18 that functions as a half mirror layer and a glass substrate 17*b* that functions as a base material that supports the half mirror layer. The reflective polarizer 18 and the glass substrate 17*b* are fixed together using an adhesive (not illustrated in the figure). The reflective polarizer 18 and the absorptive polarizer 12*b* are arranged such that the transmission axes thereof are parallel to one another.

A Sumitomo 3M reflective multilayer polarizer (product name: DBEF) is used for the reflective polarizer 18. A wire-grid reflective polarizer, cholesteric liquid crystals used in combination with a quarter-wave plate, or the like may also be used for the reflective polarizer 18. One example of a reflective polarizer in which cholesteric liquid crystals are used in combination with a quarter-wave plate is a Nitto Denko Corporation reflective polarizer (product name: NIPOCS). The material used for the half mirror layer is not particularly limited as long as the material functions similar to a beam splitter and reflects part of the incident light and transmits part of the incident light. Examples of materials other than reflective polarizers that may be used include deposited metal films, dielectric multilayer films, and the like. From the perspective of achieving both good visibility of displayed images in display mode and good visibility of reflected images in mirror mode, it is preferable that a liquid crystal display device and a reflective polarizer be used together to configure the mirror display. Moreover, from the perspective of reducing production costs, it is more preferable that a reflective polarizer rather than a dielectric multilayer film be used. The reflectance (luminous reflectance) and transmittance of the half mirror layer are not particularly limited and can be adjusted as needed by increasing or decreasing the thickness of the deposited metal film or dielectric multilayer film, by using two or more reflective polarizers in which the transmission axes thereof are shifted relative to one another, or by using two or more types of half mirror layers in combination. In addition to the beam splitter functionality described above, the half mirror layer may also exhibit an infrared light or UV light absorption functionality.

The glass substrate 17*b* is made from soda-lime glass and has a thickness of 3.2 mm. The glass substrate 17*b* may alternatively be made from fused quartz, alkali-free glass, borosilicate glass, or the like. The material used for the base material that supports the half mirror layer is not particularly limited as long as the selected material has high transparency. In addition to glass substrates, plastic substrates made from resins such as acrylic, vinyl chloride, polyethylene terephthalate, or an acrylonitrile-butadiene-styrene (ABS) copolymer synthetic resin may be used. However, from the perspective of ensuring that the half mirror plate has satisfactory flatness and rigidity, it is preferable that a glass substrate be used for the base material. The thickness of the base material is not particularly limited and can be set as needed in accordance with factors such as the resulting weight, strength, and size of the base material. Moreover, although the size of the glass substrate 17*b* is the same as the size of the liquid crystal display device 2*a* when viewed in a plan view from the viewing side, the size of the glass substrate 17*b* is not particularly limited as long as the selected size is larger than the display region but smaller than the case 5. The size of the glass substrate 17*b* can be selected as appropriate according to factors such as the method used to fix the half mirror layer thereto.

The case 5 is made from a black, light-shielding plastic resin material. The material used for the case 5 is not particularly limited as long as the selected material blocks light, and a metal such as iron or aluminum may also be used. The case 5 includes an outer frame 6 that covers the edges of the front surface of the half mirror plate 4*a*.

The auxiliary illumination units 7*a* each include white LEDs 9W' that function as an auxiliary light source and a light guide plate 10*b*. The light guide plates 10*b* are arranged on the rear side of the outer frame 6. The LEDs 9W' are also arranged on the rear side of the outer frame 6, along the edges of the respective light guide plates 10*b*. In the mirror display according to Embodiment 1, the LEDs 9W' are not easily visible from the viewing side, thereby making it possible to improve the design aesthetics of the overall mirror display. In FIG. 2, only one LED 9W' is shown arranged along the edge of each light guide plate 10*b*. However, in reality, five LEDs are arranged equally spaced along the edge of each light guide plate 10*b* when viewed in a plan view from the viewing side.

The LEDs 9W' are Nichia Corporation LED chips (product name: NSCW008AT). The members used for the auxiliary light source are not particularly limited as long as the brightness of the light emitted towards the viewing side is greater than the brightness of the liquid crystal display device when in a white display state (as measured on the viewing side of the mirror display). In addition to LEDs, fluorescent lights, organic electroluminescent elements, inorganic electroluminescent elements, or the like may be used. Among these types of auxiliary light sources, it is preferable that LEDs be used because LEDs are inexpensive and make it possible to adjust the brightness of the light. Moreover, it is more preferable that three colors of variable-brightness, variable-color LEDs in red (R), green (G), and blue (B) be used. The LEDs 9W' are controlled separately from the LED 9W. In display mode, the LEDs 9W' are not illuminated and therefore do not interfere with image display.

The light guide plate 10*b* is made from an acrylic resin and has a thickness of 3 mm. The light guide plate 10*b* has a rectangular cross-sectional shape in which a portion is cut to form a face angled at $\alpha=45°$. An anti-glare (AG) film 19 for diffusing light is fixed to this angled face. The AG film 19 is a Nitto Denko Corporation AG film (product name: AG150). The thickness of the light guide plate 10*b* is not particularly limited. However, from the perspective of reducing the distance between the half mirror plate 4*a* and the outer frame 6 in order to improve design aesthetics, it is preferable that the thickness of the light guide plate 10*b* be less than or equal to 5 mm and more preferable that the thickness be less than or equal to 3 mm. In many commercially available televisions and monitors, the distance between the screen surface and the frame is approximately 5 mm. Therefore, setting the thickness of the light guide plate 10*b* to less than or equal to 5 mm makes it possible to manufacture the mirror display without changing components other than the frame, which is advantageous from a production cost perspective.

Figure 3:
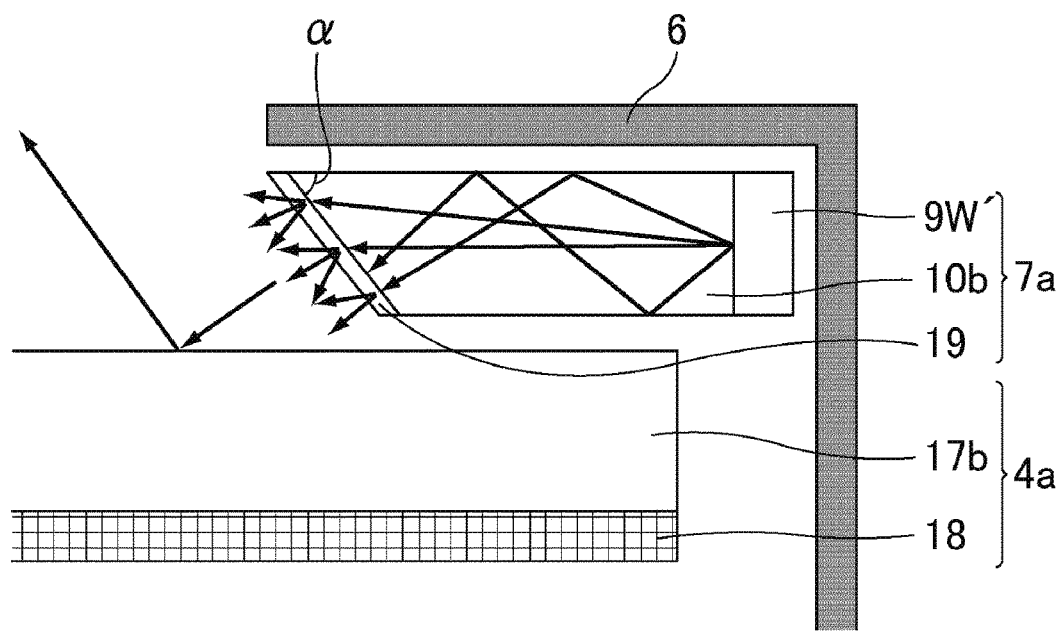
FIG. 3 is an enlarged view of an auxiliary illumination unit illustrated in FIG. 2.

The auxiliary illumination units 7*a* make it possible to emit light towards the viewing side in mirror mode by the principle illustrated in FIG. 3. FIG. 3 is an enlarged view of one of the auxiliary illumination units illustrated in FIG. 2. As illustrated by the arrows in FIG. 3, in mirror mode, light emitted from the LEDs 9W' repeatedly reflects off of the internal surfaces of the light guide plate 10b and then exits the light guide plate 10b via the AG film 19. Then, the light emitted through the AG film 19 reflects off of the surface of the half mirror plate 4a and continues in the viewing side direction. In Embodiment 1, the auxiliary illumination units 7a are arranged further on the viewing side than is the liquid crystal display device 2a, thereby making it possible to ensure that the reflected object is illuminated with light of a greater brightness than the light emitted from the liquid crystal display device 2a when in the white display state, without needing to consider light transmission loss within the liquid crystal display device 2a. In this way, the mirror display according to Embodiment 1 makes it possible to sufficiently improve the visibility of reflected images in mirror mode in dark environments.

(Embodiment 2)

Embodiment 2 also relates to the first mirror display according to the present invention. In Embodiment 2, the auxiliary illumination unit still includes the auxiliary light source and the light guide plate arranged on the rear side of an outer frame, but the size of the light guide plate is different from in Embodiment 1. Except for this aspect of the configuration, the mirror display according to Embodiment 2 is the same as the mirror display according to Embodiment 1, and therefore a description of the identical aspects will be omitted here.

Figure 4:
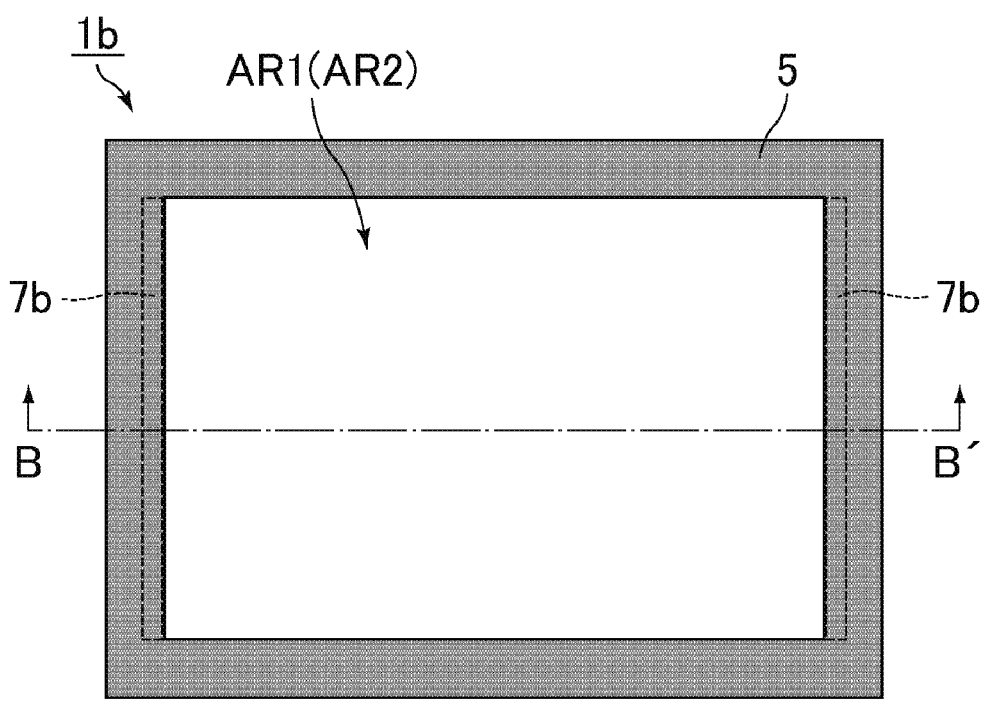
FIG. 4 is a plan view schematically illustrating a mirror display according to Embodiment 2.

FIG. 4 is a plan view schematically illustrating the mirror display according to Embodiment 2. As illustrated in FIG. 4, a mirror display 1b includes, in a region surrounded by a case 5, a display region AR1 and a mirror region AR2 that are the same size. Auxiliary illumination units 7b are arranged behind the case 5 along two opposing sides of the display region AR1 (mirror region AR2). In FIG. 4, the auxiliary illumination units 7b are arranged along two sides, but the auxiliary illumination units 7b may also be arranged along just one side or along three or more sides. Moreover, the auxiliary illumination units 7b are not limited to being arranged along the two opposing left and right sides of the display region AR1 (mirror region AR2) and may be arranged along any of the four top, bottom, left, or right sides of the display region AR1 (mirror region AR2).

Figure 5:
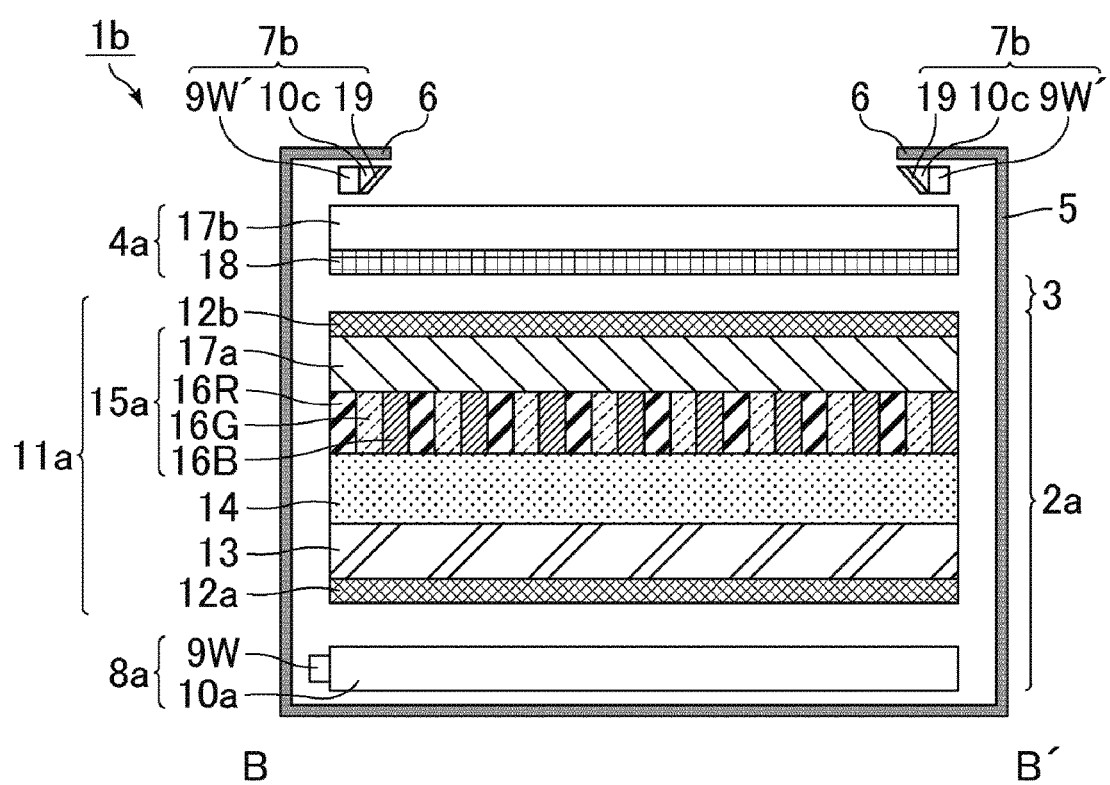
FIG. 5 is a cross-sectional view schematically illustrating a cross section taken along line B-B' in FIG. 4.

FIG. 5 is a cross-sectional view schematically illustrating a cross section taken along line B-B' in FIG. 4. As illustrated in FIG. 5, the mirror display 1b includes a liquid crystal display device 2a, an air space 3, and a half mirror plate 4a arranged in that order from the rear side to the viewing side. The mirror display 1b also includes the case 5 that supports the liquid crystal display device 2a and the half mirror plate 4a, as well as the auxiliary illumination units 7b that are arranged along the periphery of the half mirror plate 4a at the positions indicated in FIG. 4.

The auxiliary illumination units 7b each include white LEDs 9W' that function as an auxiliary light source and a light guide plate 10c. The light guide plates 10c are arranged on the rear side of an outer frame 6. The LEDs 9W' are also arranged on the rear side of the outer frame 6, along the edges of the respective light guide plates 10c. In the mirror display according to Embodiment 2, the LEDs 9W' are not easily visible from the viewing side, thereby making it possible to improve the design aesthetics of the overall mirror display. In FIG. 5, only one LED 9W' is shown arranged along the edge of each light guide plate 10c. However, in reality, five LEDs are arranged equally spaced along the edge of each light guide plate 10b when viewed in a plan view from the viewing side.

The light guide plate 10c is made from an acrylic resin and has a thickness of 2 mm. Moreover, the light guide plate 10c has an isosceles right triangle-shaped cross-sectional shape. An AG film 19 for diffusing light is fixed to the face opposite to the right angle. The thickness of the light guide plate 10c is not particularly limited. However, from the perspective of reducing the distance between the half mirror plate 4a and the outer frame 6 in order to improve design aesthetics, it is preferable that the thickness of the light guide plate 10c be less than or equal to 5 mm and more preferable that the thickness be less than or equal to 3 mm. In many commercially available televisions and monitors, the distance between the screen surface and the frame is approximately 5 mm. Therefore, setting the thickness of the light guide plate 10c to less than or equal to 5 mm makes it possible to manufacture the mirror display without changing components other than the frame, which is advantageous from a production cost perspective.

Figure 6:
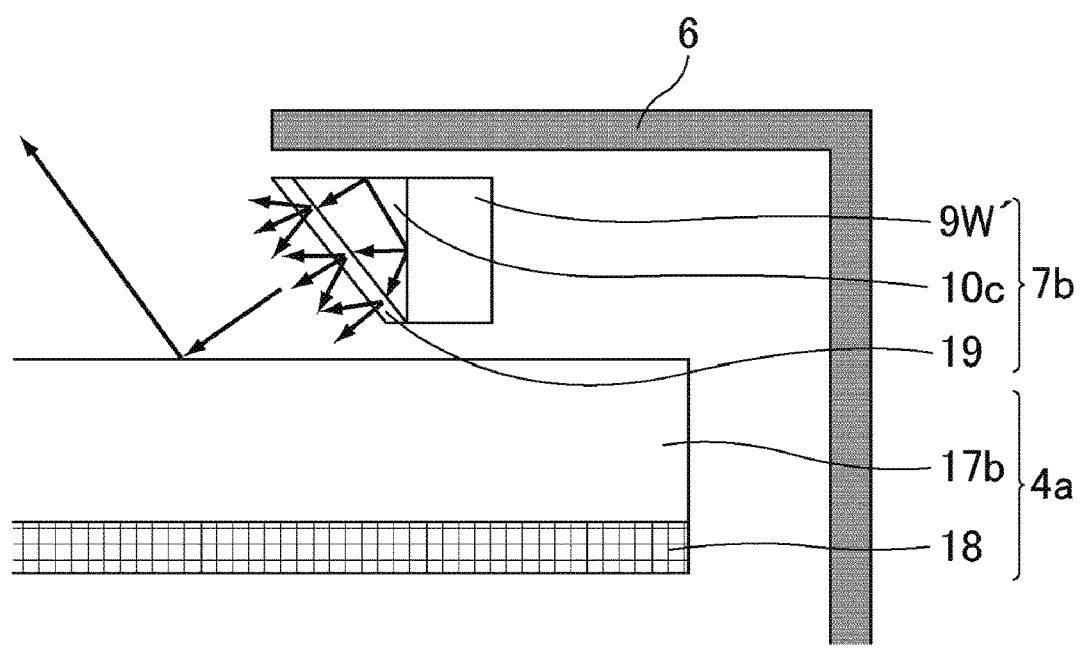
FIG. 6 is an enlarged view of an auxiliary illumination unit illustrated in FIG. 5.

The auxiliary illumination units 7b make it possible to emit light towards the viewing side in mirror mode by the principle illustrated in FIG. 6. FIG. 6 is an enlarged view of one of the auxiliary illumination units illustrated in FIG. 5. As illustrated by the arrows in FIG. 6, in mirror mode, light emitted from the LEDs 9W' repeatedly reflects off of the internal surfaces of the light guide plate 10c and then exits the light guide plate 10c via the AG film 19. Then, the light emitted through the AG film 19 reflects off of the surface of the half mirror plate 4a and continues in the viewing side direction. In Embodiment 2, the auxiliary illumination units 7b are arranged further on the viewing side than is the liquid crystal display device 2a, thereby making it possible to ensure that the reflected object is illuminated with light of a greater brightness than the light emitted from the liquid crystal display device 2a when in the white display state, without needing to consider light transmission loss within the liquid crystal display device 2a. In this way, the mirror display according to Embodiment 2 makes it possible to sufficiently improve the visibility of reflected images in mirror mode in dark environments.

(Embodiment 3)

Embodiment 3 also relates to the first mirror display according to the present invention. In Embodiment 3, the auxiliary illumination unit still includes the auxiliary light source arranged on the rear side of an outer frame but also includes diffusers arranged on the viewing side of the half mirror layer. Except for this aspect of the configuration, the mirror display according to Embodiment 3 is the same as the mirror display according to Embodiment 1, and therefore a description of the identical aspects will be omitted here.

Figure 7:
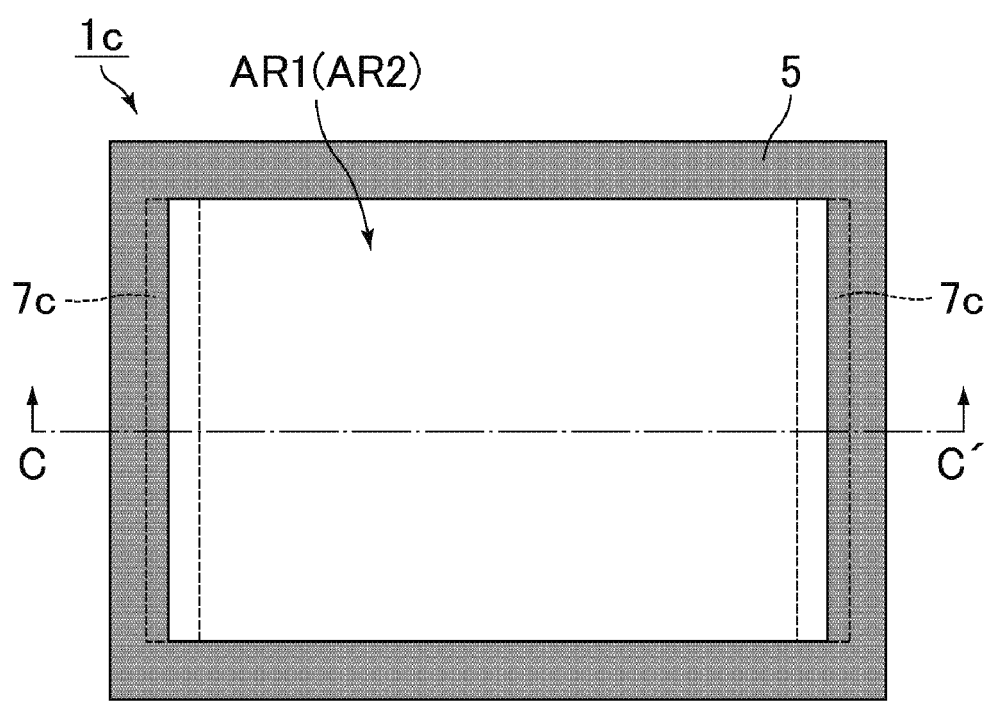
FIG. 7 is a plan view schematically illustrating a mirror display according to Embodiment 3.

FIG. 7 is a plan view schematically illustrating the mirror display according to Embodiment 3. As illustrated in FIG. 7, a mirror display 1c includes, in a region surrounded by a case 5, a display region AR1 and a mirror region AR2 that are the same size. Auxiliary illumination units 7c are arranged along two opposing sides of the display region AR1 (mirror region AR2). In FIG. 7, the auxiliary illumination units 7c are arranged along two sides, but the auxiliary illumination units 7c may also be arranged along just one side or along three or more sides. Moreover, the auxiliary illumination units 7c are not limited to being arranged along the two opposing left and right sides of the display region AR1 (mirror region AR2) and may be arranged along any of the four top, bottom, left, or right sides of the display region AR1 (mirror region AR2).

Figure 8:
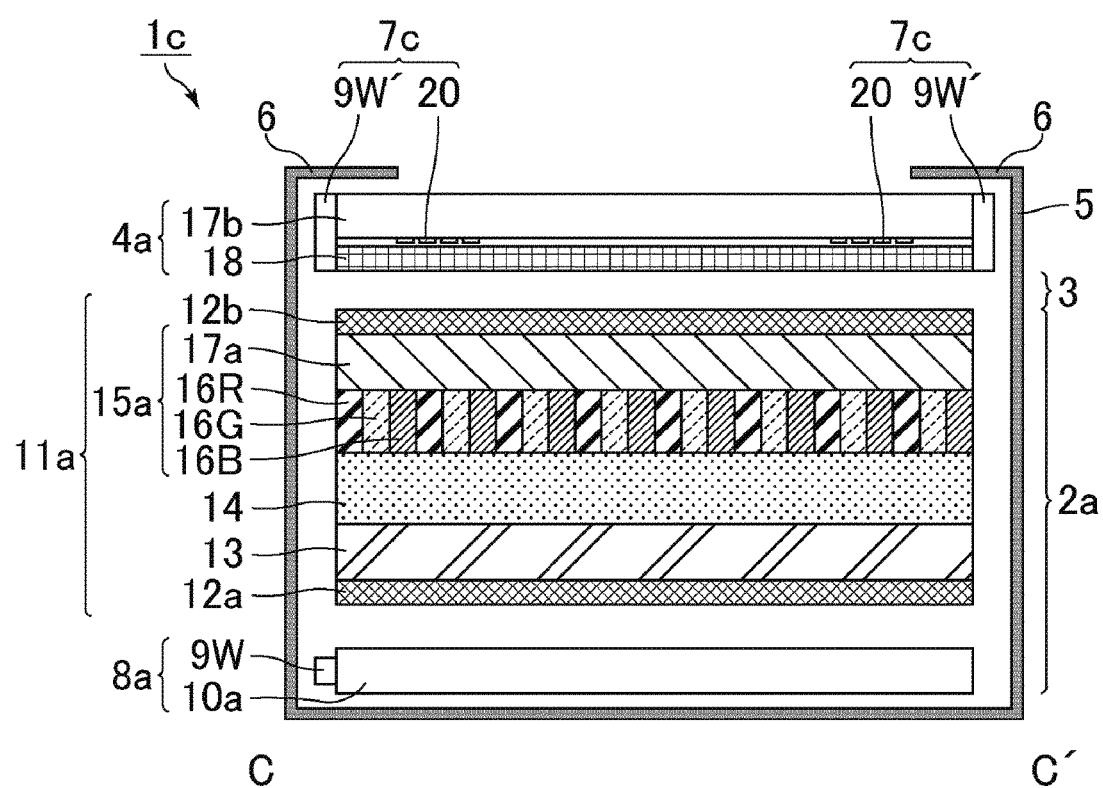
FIG. 8 is a cross-sectional view schematically illustrating a cross section taken along line C-C' in FIG. 7.

FIG. 8 is a cross-sectional view schematically illustrating a cross section taken along line C-C' in FIG. 7. As illustrated in FIG. 8, the mirror display 1c includes a liquid crystal display device 2a, an air space 3, and a half mirror plate 4a arranged in that order from the rear side to the viewing side. The mirror display 1c also includes the case 5 that supports the liquid crystal display device 2a and the half mirror plate 4a, as well as the auxiliary illumination units 7c that are arranged along the periphery of the half mirror plate 4a at the positions indicated in FIG. 7.

The half mirror plate 4a includes, arranged in order from the rear side to the viewing side, a reflective polarizer 18 that functions as a half mirror layer and a glass substrate 17b that functions as a base material that supports the half mirror layer. The reflective polarizer 18 and the glass substrate 17b are fixed together using an adhesive (not illustrated in the figure). The glass substrate 17b is made from an alkali-free glass and has a thickness of 3 mm.

The auxiliary illumination units 7c each include white LEDs 9W' that function as an auxiliary light source and diffusers 20. The diffusers 20 are arranged on the reflective polarizer 18-side surface of the glass substrate 17b. The LEDs 9W' are arranged on the rear side of the outer frame 6, along the edges of the half mirror plate 4a. In the mirror display according to Embodiment 3, the LEDs 9W' are not easily visible from the viewing side, thereby making it possible to improve the design aesthetics of the overall mirror display. In FIG. 8, only one LED 9W' is shown arranged along the respective edges of the half mirror plate 4a. However, in reality, five LEDs are arranged equally spaced along the edges of the half mirror plate 4a when viewed in a plan view from the viewing side. Furthermore, the short sides of most commercially available LEDs are approximately 1.5 mm in length. Therefore, from the perspective of ensuring that light emitted from the LEDs 9W' efficiently enters the glass substrate 17b, it is preferable that the glass substrate be at least 1.5 mm in thickness. However, even when the thickness of the glass substrate 17b is less than 1.5 mm, using a reflector makes it possible to increase the efficiency at which light enters the glass substrate 17b.

The diffusers 20 are made from a white pigmented ink material that is printed on the glass substrate 17b. When viewed in a plan view from the viewing side, the diffusers 20 have a circular shape 1 mm in diameter, with a distance of 2 mm between each diffuser. The diffusers 20 are not limited to being circular in shape and may instead be formed in polygonal shapes such as quadrilaterals or triangles. FIG. 8 shows four columns of the diffusers 20 arranged parallel to each of the short sides of the glass substrate 17b (that is, the sides that run in the direction orthogonal to the page in FIG. 8). However, in reality, there are 10 columns of the diffusers 20 arranged along each of the short sides. The diffusers 20 are arranged so as to ensure that light traveling through the interior of the half mirror plate 4a does not satisfy the total reflection condition. As long as the diffusers 20 prevent the total reflection condition from being satisfied, the diffusers 20 may have a structure other than circular dot shapes or the like, such as a pattern etched into the glass substrate 17b. Moreover, the diffusers 20 are not limited to being arranged on the reflective polarizer 18-side surface of the glass substrate 17b and may alternatively be arranged on the glass substrate 17b-side surface of the reflective polarizer 18.

Figure 9:
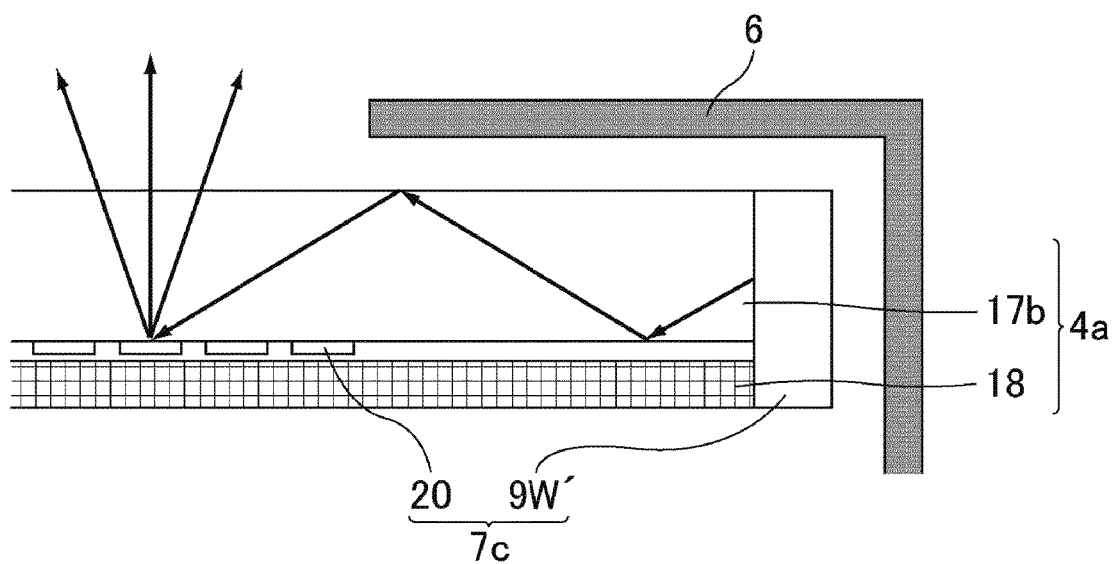
FIG. 9 is an enlarged view of an auxiliary illumination unit illustrated in FIG. 8.

The auxiliary illumination units 7c make it possible to emit light towards the viewing side in mirror mode by the principle illustrated in FIG. 9. FIG. 9 is an enlarged view of one of the auxiliary illumination units illustrated in FIG. 8.

As illustrated by the arrows in FIG. 9, in mirror mode, light emitted from the LEDs 9W' repeatedly reflects off of the internal surfaces of the glass substrate 17b and is then diffused by the diffusers 20 and exits towards the viewing side. In Embodiment 3, the auxiliary illumination units 7c are arranged further on the viewing side than is the liquid crystal display device 2a, thereby making it possible to ensure that the reflected object is illuminated with light of a greater brightness than the light emitted from the liquid crystal display device 2a when in the white display state, without needing to consider light transmission loss within the liquid crystal display device 2a. In this way, the mirror display according to Embodiment 3 makes it possible to sufficiently improve the visibility of reflected images in mirror mode in dark environments.

(Embodiment 4)

Embodiment 4 also relates to the first mirror display according to the present invention. In Embodiment 4, the auxiliary illumination unit includes an auxiliary light source arranged on the rear side of the backlight unit of the liquid crystal display device. Except for this aspect of the configuration, the mirror display according to Embodiment 4 is the same as the mirror display according to Embodiment 1, and therefore a description of the identical aspects will be omitted here.

Figure 10:
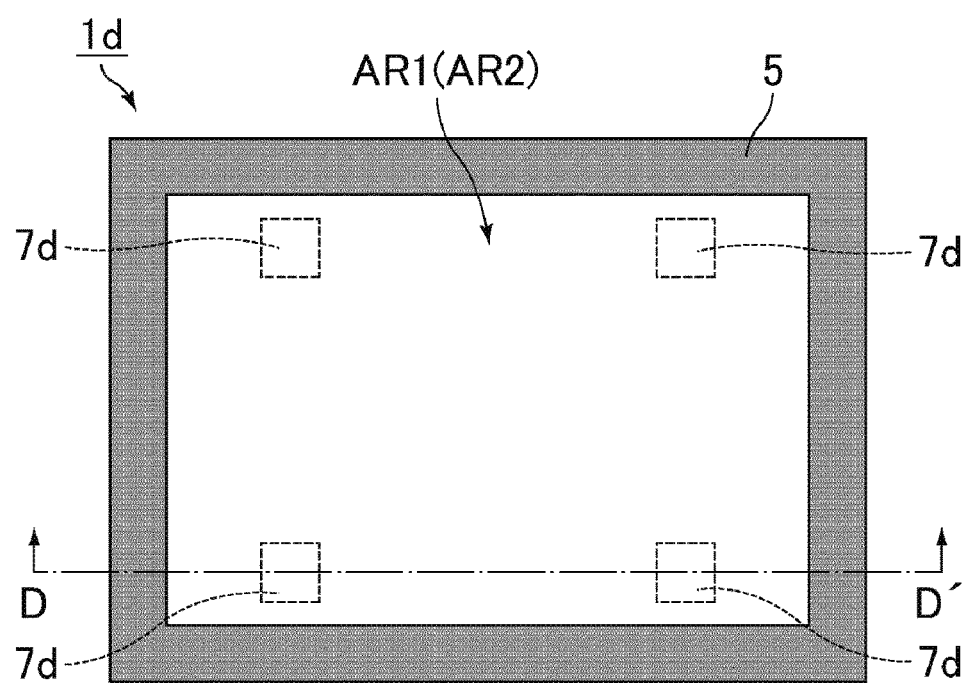
FIG. 10 is a plan view schematically illustrating a mirror display according to Embodiment 4.

FIG. 10 is a plan view schematically illustrating the mirror display according to Embodiment 4. As illustrated in FIG. 10, a mirror display 1d includes, in a region surrounded by a case 5, a display region AR1 and a mirror region AR2 that are the same size. Auxiliary illumination units 7d are arranged inside the display region AR1 (mirror region AR2). In FIG. 10, there are auxiliary illumination units 7d arranged at four locations, but the auxiliary illumination units 7d may arranged at any number of locations. Moreover, the auxiliary illumination units 7d may be arranged at any positions inside the display region AR1 (mirror region AR2).

Figure 11:
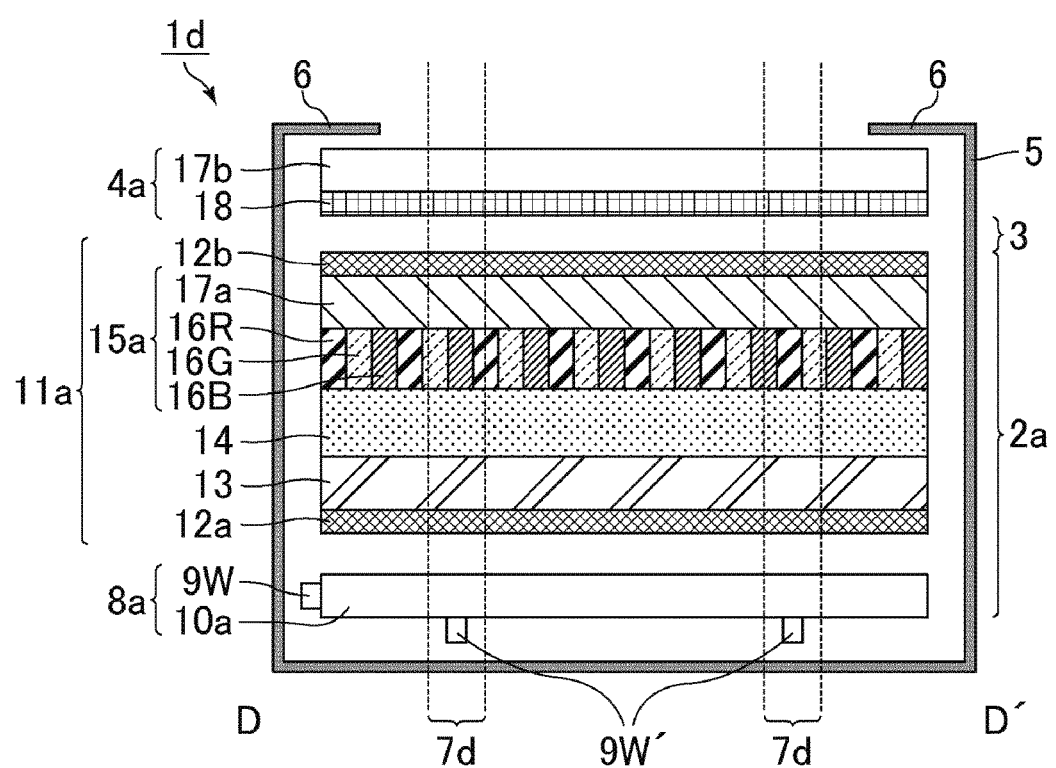
FIG. 11 is a cross-sectional view schematically illustrating a cross section taken along line D-D' in FIG. 10.

FIG. 11 is a cross-sectional view schematically illustrating a cross section taken along line D-D' in FIG. 10. As illustrated in FIG. 11, the mirror display 1d includes a liquid crystal display device 2a, an air space 3, and a half mirror plate 4a arranged in that order from the rear side to the viewing side. The mirror display 1d also includes the case 5 that supports the liquid crystal display device 2a and the half mirror plate 4a, as well as LEDs 9W' that function as an auxiliary light source and are arranged on the rear side of a backlight unit 8a of the liquid crystal display device 2a at the positions indicated in FIG. 10. In the mirror display according to Embodiment 4, the LEDs 9W' are not easily visible from the viewing side, thereby making it possible to improve the design aesthetics of the overall mirror display.

When the LEDs 9W' of the auxiliary illumination units 7d are illuminated, the regions of a liquid crystal display panel 11a that overlap with the LEDs 9W' are set to a transmissive state, thereby making it possible for light to be emitted towards the viewing side in mirror mode. In Embodiment 4, the LEDs 9W' are controlled separately from an LED 9W and have a greater brightness than the LED 9W, thereby making it possible to ensure that auxiliary illumination units 7d illuminate the reflected object with light of a greater brightness than the light from the LED 9W that is emitted from the liquid crystal display device 2a when in the white display state. In this way, the mirror display according to Embodiment 4 makes it possible to sufficiently improve the visibility of reflected images in mirror mode in dark environments. One method of ensuring that the brightness of the auxiliary light source is greater than the brightness of the display light source is to arrange a plurality of LEDs closely together to serve as the auxiliary light source, for example.

(Embodiment 5)

Embodiment 5 also relates to the first mirror display according to the present invention. In Embodiment 5, the auxiliary illumination unit includes an auxiliary light source arranged on the rear side of the half mirror plate. Moreover, Embodiment 5 relates to a configuration in which the size of the liquid crystal display device is less than the size of the half mirror plate when viewed in a plan view from the viewing side. Except for these aspects of the configuration, the mirror display according to Embodiment 5 is the same as the mirror display according to Embodiment 1, and therefore a description of the identical aspects will be omitted here.

Figure 12:
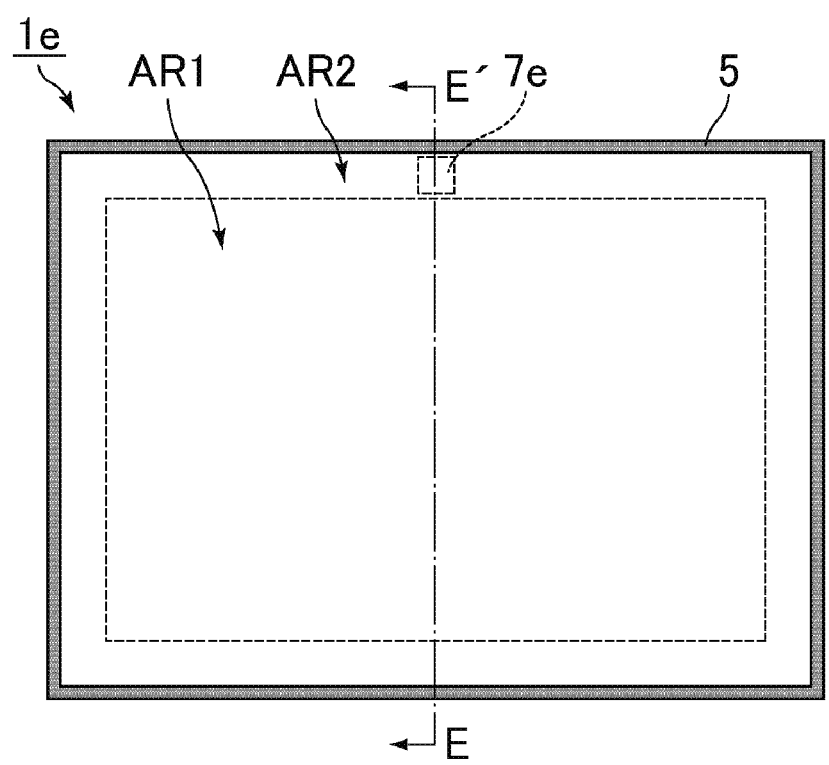
FIG. 12 is a plan view schematically illustrating a mirror display according to Embodiment 5.

FIG. 12 is a plan view schematically illustrating the mirror display according to Embodiment 5. As illustrated in FIG. 12, a mirror display 1e includes, in a region surrounded by a case 5, a display region AR1 and a mirror region AR2 that is larger than the display region AR1. An auxiliary illumination unit 7e is arranged inside the mirror region AR2 but outside of the display region AR1. In FIG. 12, the auxiliary illumination unit 7e is arranged at one location, but a plurality of the auxiliary illumination units 7e may be arranged at two or more locations. Moreover, the auxiliary illumination unit 7e may be arranged at any position inside the mirror region AR2 but outside of the display region AR1.

Figure 13:
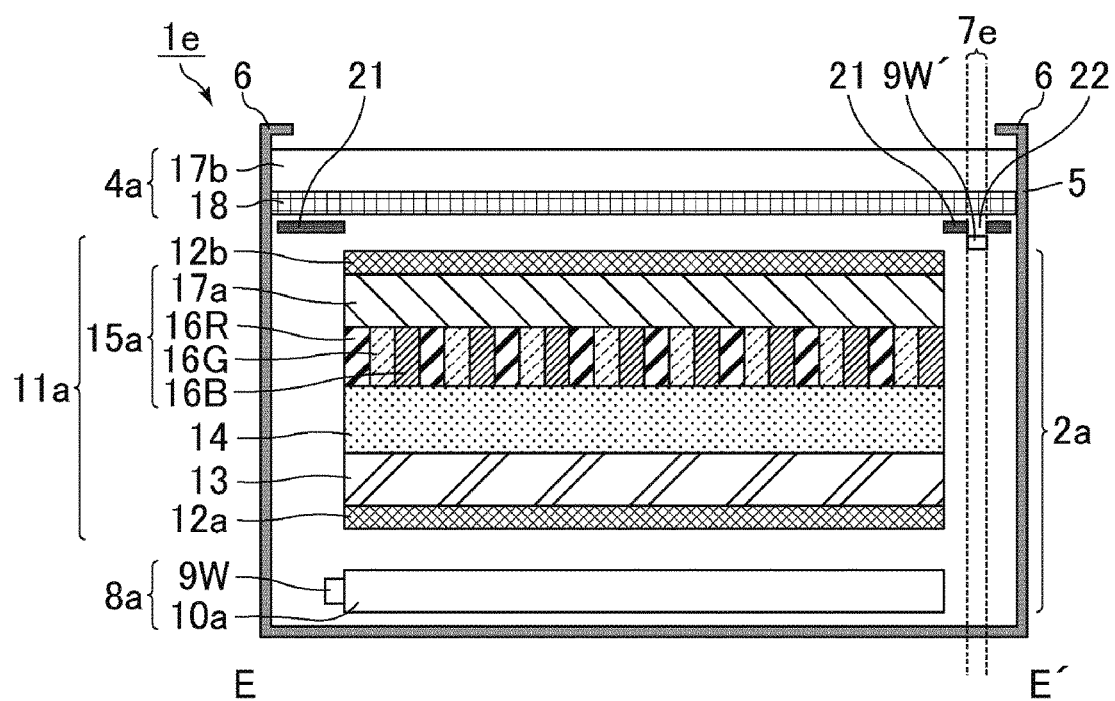
FIG. 13 is a cross-sectional view schematically illustrating a cross section taken along line E-E' in FIG. 12.

FIG. 13 is a cross-sectional view schematically illustrating a cross section taken along line E-E' in FIG. 12. As illustrated in FIG. 13, the mirror display 1e includes a liquid crystal display device 2a and a half mirror plate 4a arranged in that order from the rear side to the viewing side. The mirror display 1e also includes the case 5 that supports the liquid crystal display device 2a and the half mirror plate 4a, a light shield 21 that is arranged on the rear side of the half mirror plate 4a and outside of the region in which the liquid crystal display device 2a and the half mirror plate 4a face one another, and an LED 9W' that functions as an auxiliary light source and is arranged on the rear side of an opening 22 formed in the light shield 21 at the position indicated in FIG. 12. In the mirror display according to Embodiment 5, the LED 9W' is not easily visible from the viewing side, thereby making it possible to improve the design aesthetics of the overall mirror display. In the mirror display according to Embodiment 5, the LED 9W' is arranged on the rear side of the opening 22, but the LED 9W' may alternatively be arranged at the same position as the opening 22. The size of the liquid crystal display device 2a is smaller than the size of the half mirror plate 4a when viewed in a plan view from the viewing side. In this way, display mode and mirror mode can be used at the same time, with the region outside of the display region functioning as a mirror. Moreover, the size of the half mirror plate 4a is substantially the same size as the external shape of the overall mirror display 1e.

The light shield 21 is a black polyethylene terephthalate (PET) film fixed in place using an adhesive (not illustrated in the figure). The light shield 21 may alternatively be made from black paper or a plastic resin such as acrylic, ABS, or vinyl chloride. The light shield 21 is arranged on the rear side of the half mirror plate 4a and blocks light in a region that does not face the liquid crystal display device 2a, thereby allowing the half mirror plate 4a to continue to function as a mirror in that region. Moreover, as long as the light shield 21 is arranged on the rear side of the half mirror plate 4a, the light shield 21 may be fixed to the half mirror plate 4a using an adhesive or may be arranged separately without being fixed to the half mirror plate 4a. Moreover, an acrylic coating material or the like may be applied directly to the rear side of the half mirror plate 4a at a prescribed position to form the light shield 21.

Light emitted from the LED 9W' of the auxiliary illumination unit 7e passes through the opening 22 and the region of the half mirror plate 4a that overlaps with the LED 9W', thereby allowing the light to be emitted out towards the viewing side in mirror mode. In Embodiment 5, light from the auxiliary illumination unit 7e does not pass through the liquid crystal display device 2a, thereby making it possible to ensure that the reflected object is illuminated with light of a greater brightness than the light emitted from the liquid crystal display device 2a when in the white display state. In this way, the mirror display according to Embodiment 5 makes it possible to sufficiently improve the visibility of reflected images in mirror mode in dark environments.

(Embodiment 6)

Embodiment 6 also relates to the first mirror display according to the present invention. In Embodiment 6, the auxiliary illumination unit still includes an auxiliary light source arranged on the rear side of an outer frame but also includes diffusers arranged on the viewing side of the half mirror layer. Moreover, Embodiment 6 relates to a configuration in which the size of the liquid crystal display device is less than the size of the half mirror plate when viewed in a plan view from the viewing side. Except for the locations at which the diffusers are arranged and the sizes of the liquid crystal display device and the half mirror plate, the mirror display according to Embodiment 6 is the same as the mirror display according to Embodiment 3, and therefore a description of the identical aspects will be omitted here.

Figure 14:
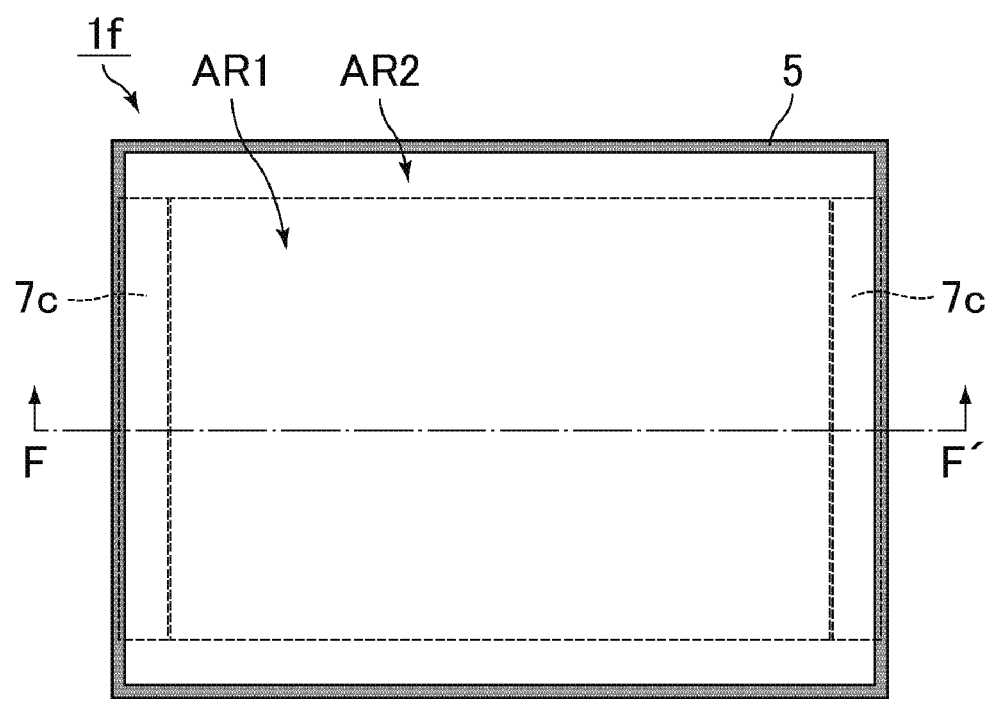
FIG. 14 is a plan view schematically illustrating a mirror display according to Embodiment 6.

FIG. 14 is a plan view schematically illustrating the mirror display according to Embodiment 6. As illustrated in FIG. 14, a mirror display 1f includes, in a region surrounded by a case 5, a display region AR1 and a mirror region AR2 that is larger than the display region AR1. Auxiliary illumination units 7c are arranged on the rear side of the case 5 in a region outside of the display region AR1. In FIG. 14, the auxiliary illumination units 7c are arranged along two sides, but the auxiliary illumination units 7c may also be arranged along just one side or along three or more sides. Moreover, the auxiliary illumination units 7c may be arranged at any position that is outside of the display region AR1 on the rear side of the case 5.

Figure 15:
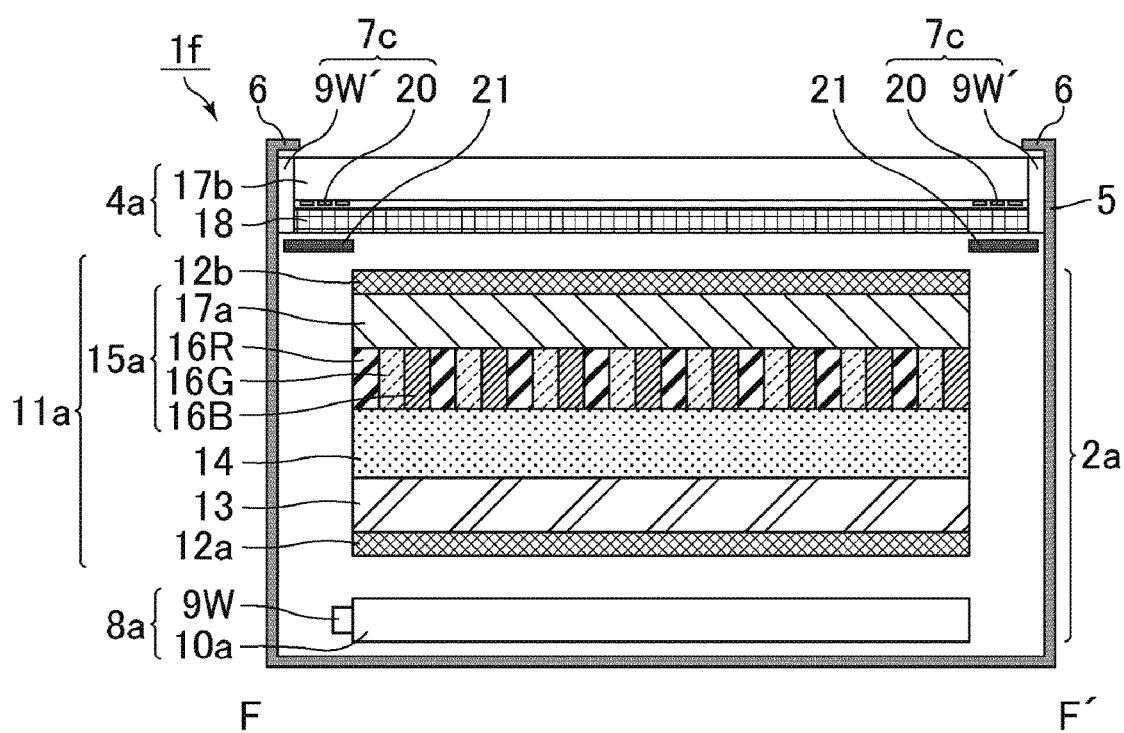
FIG. 15 is a cross-sectional view schematically illustrating a cross section taken along line F-F' in FIG. 14.

FIG. 15 is a cross-sectional view schematically illustrating a cross section taken along line F-F' in FIG. 14. As illustrated in FIG. 15, the mirror display 1f includes a liquid crystal display device 2a and a half mirror plate 4a arranged in that order from the rear side to the viewing side. The mirror display 1f also includes the case 5 that supports the liquid crystal display device 2a and the half mirror plate 4a, a light shield 21 that is arranged on the rear side of the half mirror plate 4a and outside of the region in which the liquid crystal display device 2a and the half mirror plate 4a face one another, and the auxiliary illumination units 7c that are arranged along the periphery of the half mirror plate 4a at the positions indicated in FIG. 14. The light shield 21 is the same as the light shield in Embodiment 5. The size of the liquid crystal display device 2a is smaller than the size of the half mirror plate 4a when viewed in a plan view from the viewing side. In this way, display mode and mirror mode can be used at the same time, with the region outside of the display region functioning as a mirror. Moreover, the size of the half mirror plate 4a is substantially the same size as the external shape of the overall mirror display 1f.

The auxiliary illumination units 7c each include white LEDs 9W' that function as an auxiliary light source and diffusers 20. The diffusers 20 are arranged outside of the region in which the liquid crystal display device 2a and the half mirror plate 4a face one another on a reflective polarizer 18 side of a glass substrate 17b. The LEDs 9W' are arranged on the rear side of an outer frame 6, along the edges of the half mirror plate 4a. In the mirror display according to Embodiment 6, the LEDs 9W' are not easily visible from the viewing side, thereby making it possible to improve the design aesthetics of the overall mirror display.

The auxiliary illumination units 7c make it possible to emit light towards the viewing side in mirror mode by the same principle as in Embodiment 3. In this way, the mirror display according to Embodiment 6 makes it possible to sufficiently improve the visibility of reflected images in mirror mode in dark environments.

(Embodiment 7)

Embodiment 7 also relates to the first mirror display according to the present invention. In Embodiment 7, the auxiliary illumination unit includes an auxiliary light source arranged on the rear side of the backlight unit of the liquid crystal display device. Moreover, Embodiment 7 relates to a configuration in which the size of the liquid crystal display device is less than the size of the half mirror plate when viewed in a plan view from the viewing side. Except for the sizes of the liquid crystal display device and the half mirror plate, the mirror display according to Embodiment 7 is the same as the mirror display according to Embodiment 4, and therefore a description of the identical aspects will be omitted here.

Figure 16:
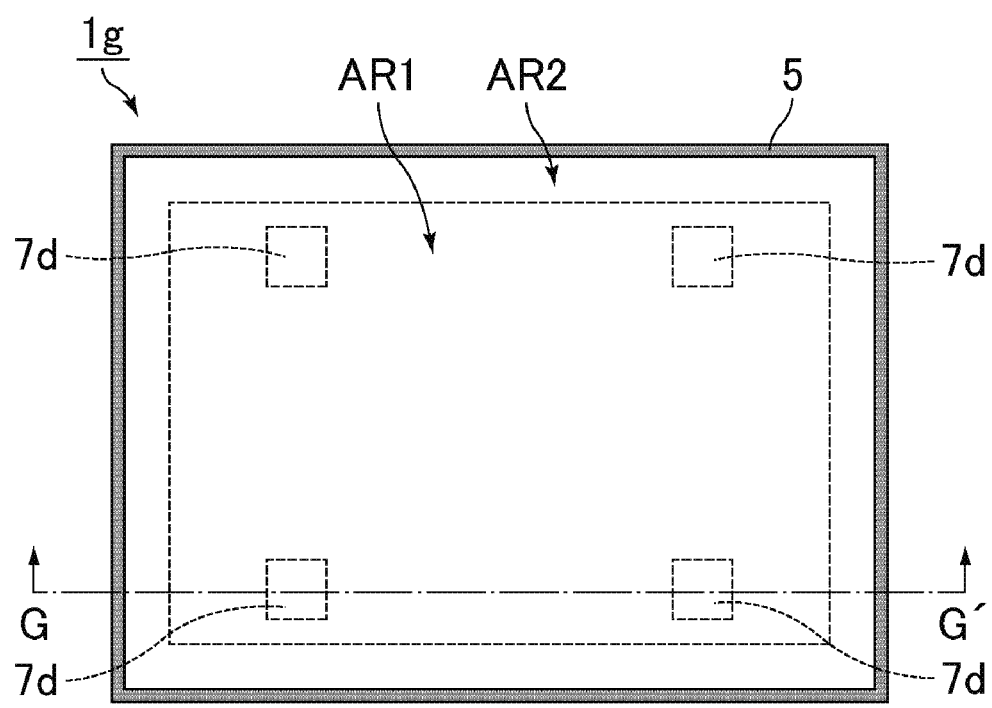
FIG. 16 is a plan view schematically illustrating a mirror display according to Embodiment 7.

FIG. 16 is a plan view schematically illustrating the mirror display according to Embodiment 7. As illustrated in FIG. 16, a mirror display 1g includes, in a region surrounded by a case 5, a display region AR1 and a mirror region AR2 that is larger than the display region AR1. Auxiliary illumination units 7d are arranged inside the display region AR1. In FIG. 16, there are auxiliary illumination units 7d arranged at four locations, but the auxiliary illumination units 7d may arranged at any number of locations. Moreover, the auxiliary illumination units 7d may be arranged at any positions inside the display region AR1.

Figure 17:
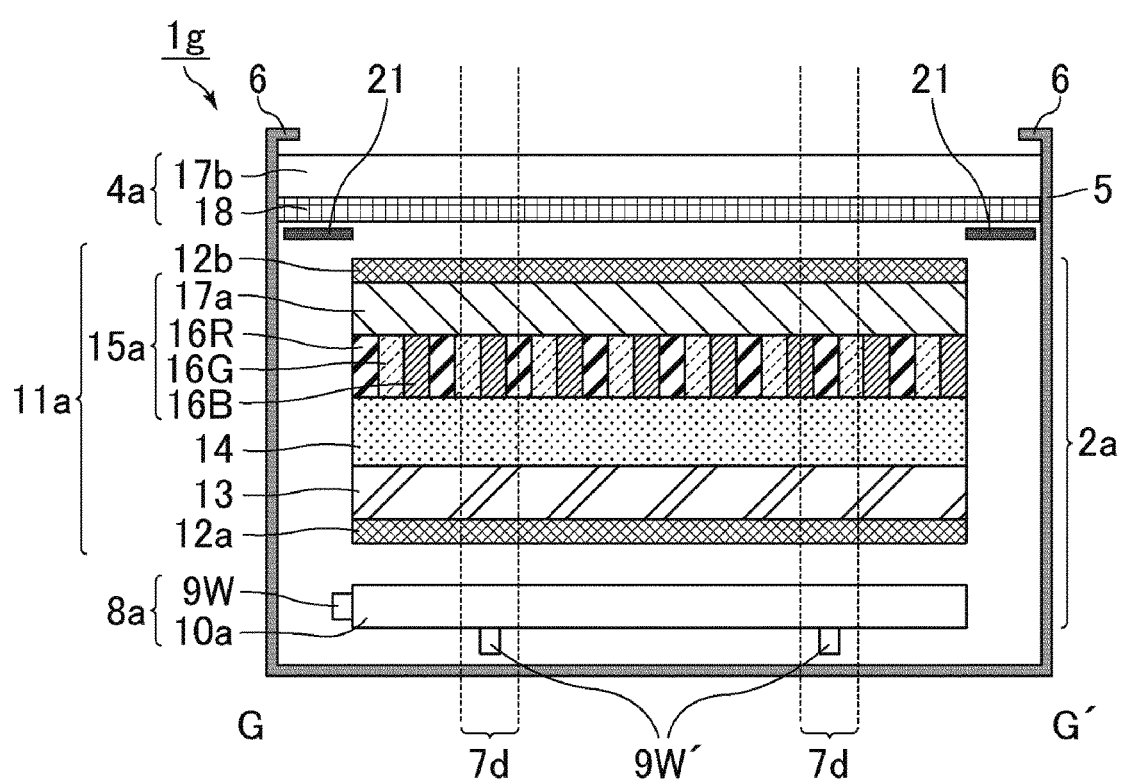
FIG. 17 is a cross-sectional view schematically illustrating a cross section taken along line G-G' in FIG. 16.

FIG. 17 is a cross-sectional view schematically illustrating a cross section taken along line G-G' in FIG. 16. As illustrated in FIG. 17, the mirror display 1g includes a liquid crystal display device 2a and a half mirror plate 4a arranged in that order from the rear side to the viewing side. The mirror display 1g also includes the case 5 that supports the liquid crystal display device 2a and the half mirror plate 4a, a light shield 21 that is arranged on the rear side of the half mirror plate 4a and outside of the region in which the liquid crystal display device 2a and the half mirror plate 4a face one another, and LEDs 9W' that function as an auxiliary light source and are arranged on the rear side of a backlight unit 8a of the liquid crystal display device 2a at the positions indicated in FIG. 16. In the mirror display according to Embodiment 7, the LEDs 9W' are not easily visible from the viewing side, thereby making it possible to improve the design aesthetics of the overall mirror display. The light shield 21 is the same as the light shield in Embodiment 5. The size of the liquid crystal display device 2a is smaller than the size of the half mirror plate 4a when viewed in a plan view from the viewing side. In this way, display mode and mirror mode can be used at the same time, with the region outside of the display region functioning as a mirror. Moreover, the size of the half mirror plate 4a is substantially the same size as the external shape of the overall mirror display 1g.

When the LEDs 9W' of the auxiliary illumination units 7d are illuminated, the regions of a liquid crystal display panel 11a that overlap with the LEDs 9W' are set to a transmissive state, thereby making it possible for light to be emitted towards the viewing side in mirror mode. In Embodiment 7, the LEDs 9W' are controlled separately from an LED 9W and have a greater brightness than the LED 9W, thereby making it possible to ensure that auxiliary illumination units 7d illuminate the reflected object with light of a greater brightness than the light from the LED 9W that is emitted from the liquid crystal display device 2a when in the white display state. In this way, the mirror display according to Embodiment 7 makes it possible to sufficiently improve the visibility of reflected images in mirror mode in dark environments.

(Embodiment 8)

Embodiment 8 relates to a second mirror display according to the present invention. In Embodiment 8, an auxiliary illumination unit emits light from a portion of the display light sources of a liquid crystal display device towards the viewing side through a portion in which color filter layers are thinner than in other portions. Except for this aspect of the configuration, the mirror display according to Embodiment 8 is substantially the same as the mirror display according to Embodiment 1, and therefore a description of the identical aspects will be omitted here.

Figure 18:
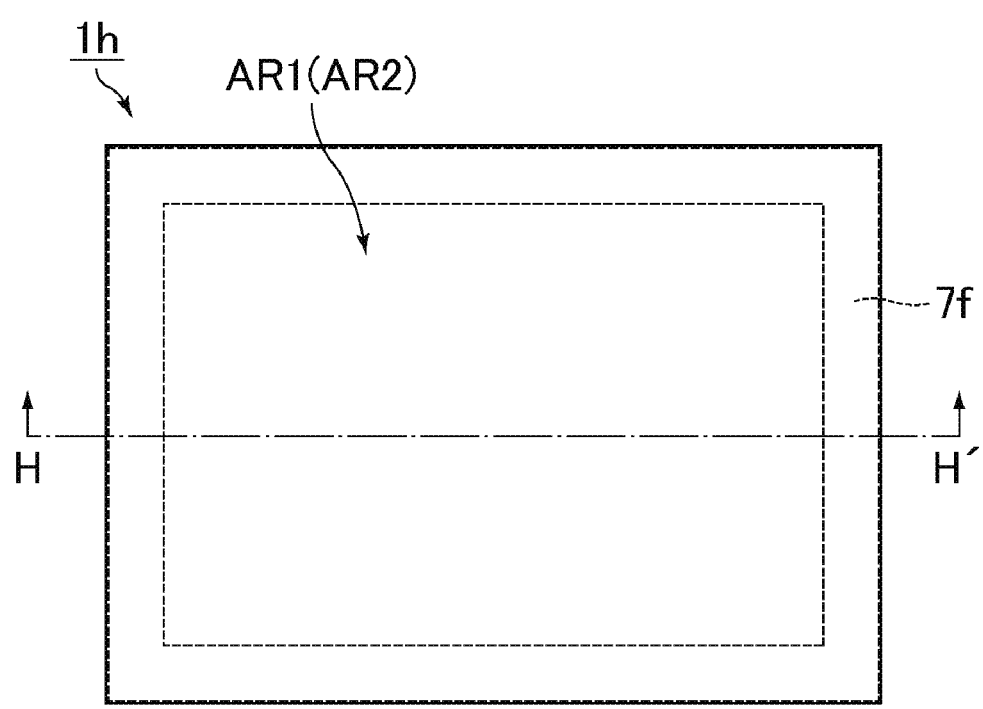
FIG. 18 is a plan view schematically illustrating a mirror display according to Embodiment 8.

FIG. 18 is a plan view schematically illustrating the mirror display according to Embodiment 8. As illustrated in FIG. 18, a mirror display 1h includes a display region AR1 and a mirror region AR2 that are the same size. An auxiliary illumination unit 7f is arranged along the periphery of the display region AR1 (mirror region AR2). In FIG. 18, the auxiliary illumination unit 7f is arranged along the entire periphery of the display region AR1 (mirror region AR2). However, the auxiliary illumination unit 7f may alternatively be arranged along just one side or two opposing sides of the display region AR1 (mirror region AR2), in one half or in the center portion of the display region AR1 (mirror region AR2), or the like. The location at which the auxiliary illumination unit 7f is arranged may be determined as appropriate according to the size of the mirror display 1h or the intended use case therefor. This applies to Embodiments 9 to 18 as well.

Figure 19:
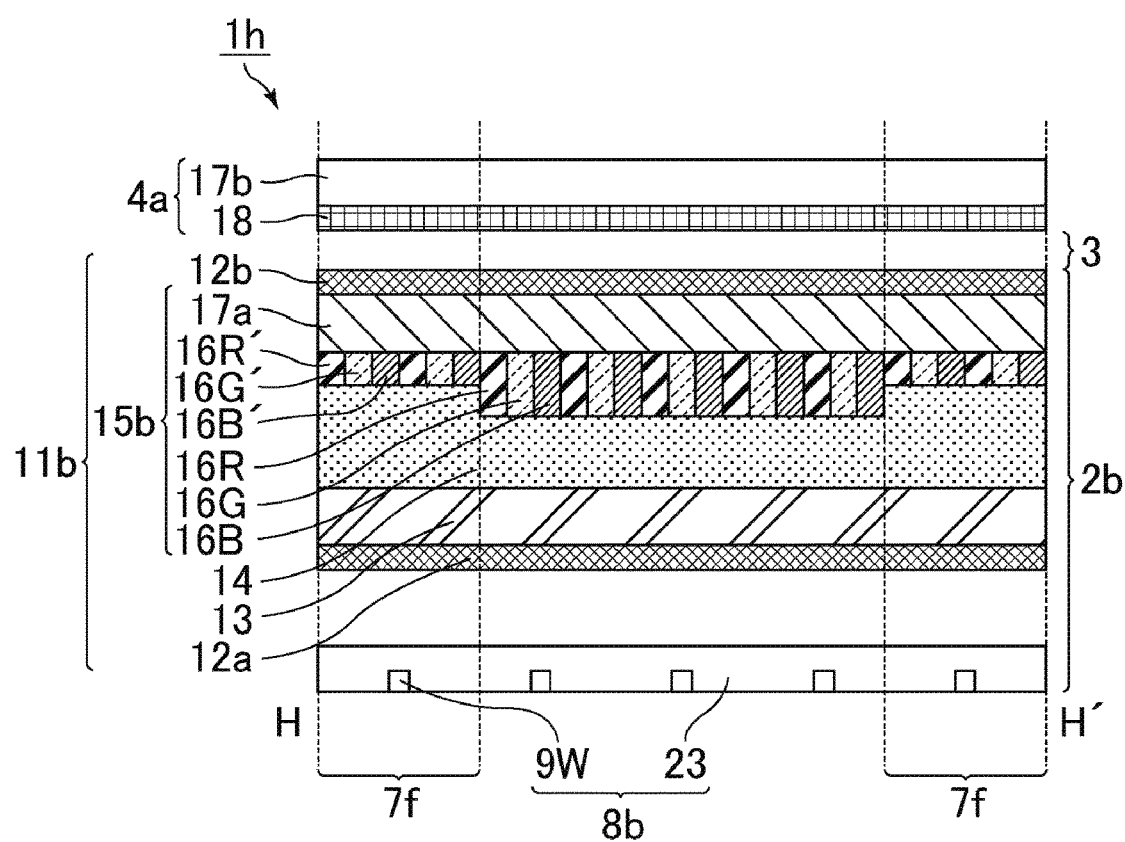
FIG. 19 is a cross-sectional view schematically illustrating a cross section taken along line H-H' in FIG. 18.

FIG. 19 is a cross-sectional view schematically illustrating a cross section taken along line H-H' in FIG. 18. As illustrated in FIG. 19, the mirror display 1h includes a liquid crystal display device 2b, an air space 3, and a half mirror plate 4a arranged in that order from the rear side to the viewing side. The liquid crystal display device 2b includes the auxiliary illumination unit 7f, which is arranged along the periphery of the display region AR1 (mirror region AR2) at the position indicated in FIG. 18. The size of the liquid crystal display device 2b is the same as the size of the half mirror plate 4a when viewed in a plan view from the viewing side. The liquid crystal display device 2b and the half mirror plate 4a are fixed together by a pair of aluminum rails that are attached in a frame shape to the top and bottom edges of the liquid crystal display device 2b and engage with the top and bottom edges of the half mirror plate 4a. The air space 3 is a small gap formed between the liquid crystal display device 2b and the half mirror plate 4a.

The liquid crystal display device 2b includes a backlight unit 8b and a liquid crystal display panel 11b arranged in that order from the rear side to the viewing side.

The backlight unit 8b is a direct-lit backlight device that includes white LEDs 9W that function as a display light source and a diffusion plate 23 that is arranged covering the LEDs 9W. The diffusion plate 23 is a Sumitomo Chemical Co. diffusion plate (product name: SUMIPEX E (registered trademark)).

The liquid crystal display panel 11b includes an absorptive polarizer 12a (a second polarizer), a thin-film transistor array substrate 13 (a second substrate), a liquid crystal layer 14, a color filter substrate 15b (a first substrate), and an absorptive polarizer 12b (a first substrate) that are arranged in that order from the rear side to the viewing side. The display mode and drive method of the liquid crystal display panel 11b are the same as in Embodiment 1.

The color filter substrate 15b includes a glass substrate 17a and color filter layers 16R, 16G, 16B, 16R' (red), 16G' (green), and 16B' (blue) that are arranged on the thin-film transistor array substrate 13 side of the glass substrate 17a. The thickness of the color filter layers 16R', 16G', and 16B' is equal to half of the thickness of the color filter layers 16R, 16G, and 16B. The color filter layers 16R', 16G', and 16B' are arranged along the periphery of the color filter substrate 15b, and the color filter layers 16R, 16G, and 16B are arranged in the remaining portion of the color filter substrate 15b.

The auxiliary illumination unit 7f includes a portion of the display light sources (LEDs 9W). Therefore, in the mirror display according to Embodiment 8, the LEDs 9W that are used as part of the auxiliary illumination unit 7f are not easily visible from the viewing side, thereby making it possible to improve the design aesthetics of the overall mirror display.

In mirror mode, the auxiliary illumination unit 7f emits the light from the LEDs 9W that are used as part of the auxiliary illumination unit 7f out towards the viewing side through the portion in which the color filter layers 16R', 16G', and 16B' are arranged (a first portion). Of the light from the LEDs 9W that are used as part of the auxiliary illumination unit 7f, the amount of light absorbed by the portion in which the color filter layers 16R', 16G', and 16B' are arranged is less than the amount of light absorbed by the portion in which the color filter layers 16R, 16G, and 16B are arranged. As a result, the brightness (as measured on the viewing side) of the light that passes through the auxiliary illumination unit 7f is greater than the brightness of the light from the liquid crystal display device 2b when in the white display state. In this way, the mirror display according to Embodiment 8 makes it possible to sufficiently improve the visibility of reflected images in mirror mode in dark environments. Moreover, to reduce the amount of light that gets absorbed by the color filter layers, a modification example could be configured such that the auxiliary illumination unit emits light towards the viewing side through a portion (a third portion) of the color filter substrate in which the concentration of the material used to form the color filter layers (such as a colored pigment) is less than in other portions of the color filter substrate. Such a modification example would make it possible to achieve the same effects as Embodiment 8.

In display mode, light from the auxiliary illumination unit 7f can be prevented from interfering with image display by simply turning off the LEDs 9W that are used as part of the auxiliary illumination unit 7f or by not applying a voltage to the portion of the liquid crystal display panel 11b that corresponds to the auxiliary illumination unit 7f in order to set that portion to the black display state. Light from the auxiliary illumination unit 7f can also be prevented from interfering with image display by using a local dimming backlight in which the amount of light emitted can be adjusted as the light source that is used as part of the auxiliary illumination unit 7f. The LEDs 9W that are used as part of the auxiliary illumination unit 7f may be controlled on a separate circuit than the other display light sources or on the same circuit. From the perspective of improving usability, it is preferable that a separate control circuit be used.

(Embodiment 9)

Embodiment 9 also relates to the second mirror display according to the present invention. In Embodiment 9, an auxiliary illumination unit emits light from a portion of the display light sources of a liquid crystal display device towards the viewing side through a portion in which color filter layers are not present. Except for this aspect of the configuration, the mirror display according to Embodiment 9 is the same as the mirror display according to Embodiment 8, and therefore a description of the identical aspects will be omitted here.

Figure 20:
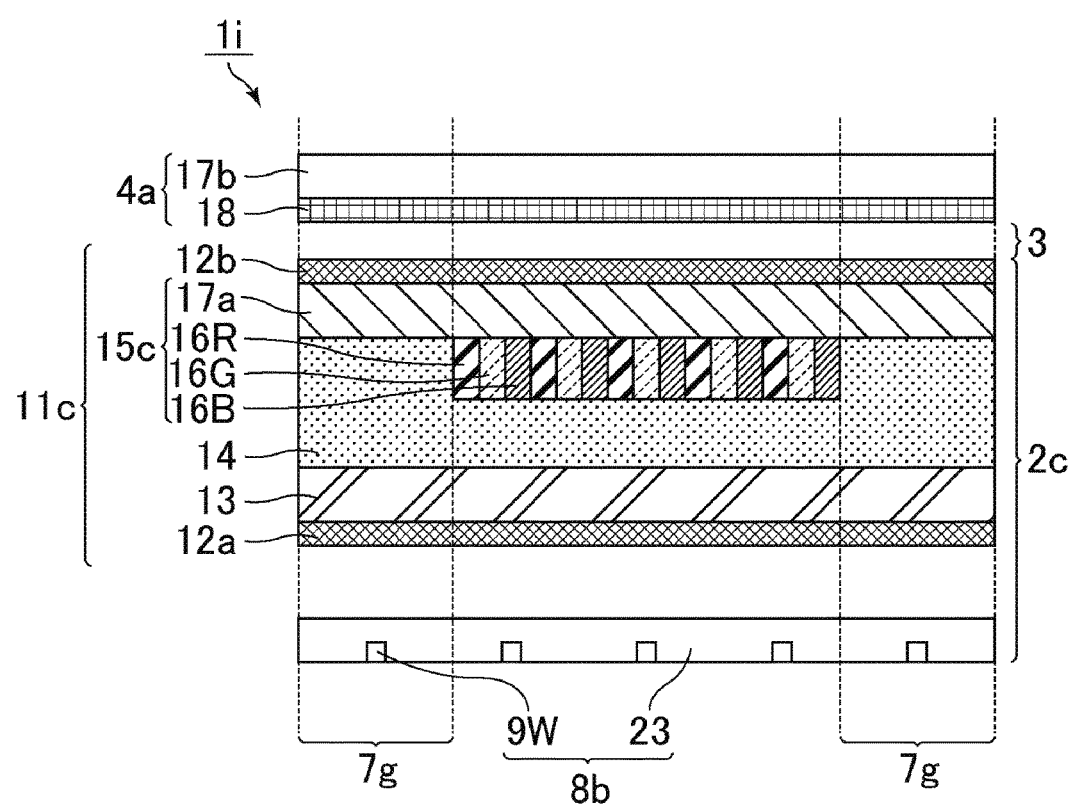
FIG. 20 is a cross-sectional view schematically illustrating a mirror display according to Embodiment 9.

FIG. 20 is a cross-sectional view schematically illustrating the mirror display according to Embodiment 9. As illustrated in FIG. 20, a mirror display 1i includes a liquid crystal display device 2c, an air space 3, and a half mirror plate 4a arranged in that order from the rear side to the viewing side. The liquid crystal display device 2c includes an auxiliary illumination unit 7g, which is arranged along the periphery of a display region AR1 (mirror region AR2).

The liquid crystal display device 2c also includes a backlight unit 8b and a liquid crystal display panel 11c arranged in that order from the rear side to the viewing side.

The liquid crystal display panel 11c includes an absorptive polarizer 12a, a thin-film transistor array substrate 13, a liquid crystal layer 14, a color filter substrate 15c, and an absorptive polarizer 12b that are arranged in that order from the rear side to the viewing side. The display mode and drive method of the liquid crystal display panel 11c are the same as in Embodiment 8.

The color filter substrate 15c includes a glass substrate 17a and color filter layers 16R, 16G, and 16B that are arranged on the thin-film transistor array substrate 13 side of the glass substrate 17a. The color filter layers are not arranged around the periphery of the color filter substrate 15c.

The auxiliary illumination unit 7g includes a portion of the display light sources (LEDs 9W). Therefore, in the mirror display according to Embodiment 9, the LEDs 9W that are used as part of the auxiliary illumination unit 7g are not easily visible from the viewing side, thereby making it possible to improve the design aesthetics of the overall mirror display.

In mirror mode, the auxiliary illumination unit 7g emits the light from the LEDs 9W that are used as part of the auxiliary illumination unit 7g out towards the viewing side through the portion (a second portion) in which the color filter layers are not present. The color filter layers 16R, 16G, and 16B each respectively transmit approximately ⅓ of the wavelengths of light in the visible spectrum from 400 to 700 nm, and the other approximately ⅔ of these wavelengths of light are respectively absorbed by the respective color filter layers. Moreover, each color filter layer occupies ⅓ of the area of the overall corresponding pixel. Letting the total amount of light that enters the color filter substrate 15c be 1, the amount of light that passes through the portion in which the color filter layers 16R, 16G, and 16B are arranged is equal to ⅓×⅓+⅓×⅓+⅓×⅓=⅓. As a result, the amount of light that passes through the portion in which the color filter layers are not present is three times greater than the amount of light that passes through the portion in which the color filter layers 16R, 16G, and 16B are arranged. Therefore, the brightness (as measured on the viewing side) of the light that passes through the auxiliary illumination unit 7g is greater than the brightness of the light from the liquid crystal display device 2c when in the white display state. In this way, the mirror display according to Embodiment 9 makes it possible to sufficiently improve the visibility of reflected images in mirror mode in dark environments.

(Embodiment 10)

Embodiment 10 also relates to the second mirror display according to the present invention. In Embodiment 10, an auxiliary illumination unit emits light from a portion of the display light sources of a liquid crystal display device towards the viewing side through a portion that includes pixels in which color filter layers are not present as well as some pixels in which color filter layers are present. Except for this aspect of the configuration, the mirror display according to Embodiment 10 is the same as the mirror display according to Embodiment 8, and therefore a description of the identical aspects will be omitted here.

Figure 21:
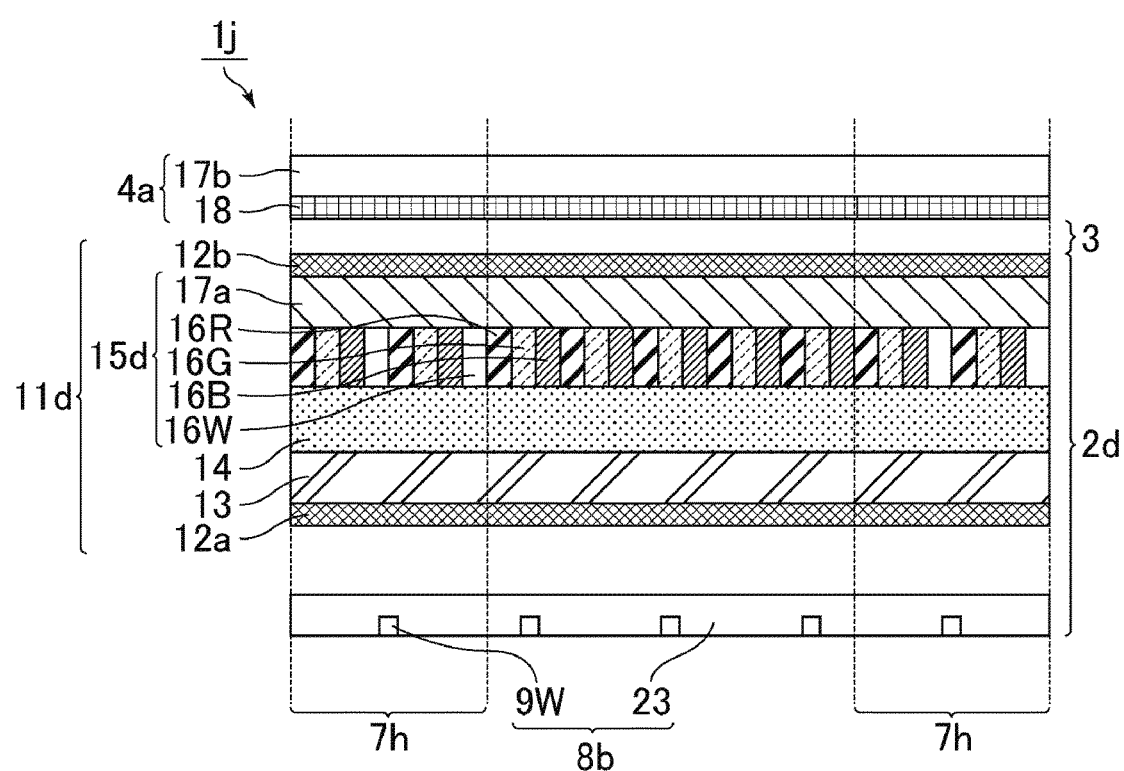
FIG. 21 is a cross-sectional view schematically illustrating a mirror display according to Embodiment 10.

FIG. 21 is a cross-sectional view schematically illustrating the mirror display according to Embodiment 10. As illustrated in FIG. 21, a mirror display 1j includes a liquid crystal display device 2d, an air space 3, and a half mirror plate 4a arranged in that order from the rear side to the viewing side. The liquid crystal display device 2d includes an auxiliary illumination unit 7h, which is arranged along the periphery of a display region AR1 (mirror region AR2).

The liquid crystal display device 2d also includes a backlight unit 8b and a liquid crystal display panel 11d arranged in that order from the rear side to the viewing side.

The liquid crystal display panel 11d includes an absorptive polarizer 12a, a thin-film transistor array substrate 13, a liquid crystal layer 14, a color filter substrate 15d, and an absorptive polarizer 12b that are arranged in that order from the rear side to the viewing side. The display mode and drive method of the liquid crystal display panel 11d are the same as in Embodiment 8.

The color filter substrate 15d includes a glass substrate 17a and color filter layers 16R, 16G, 16B, and 16W that are arranged on the thin-film transistor array substrate 13 side of the glass substrate 17a. The pixels in which the color filter layers 16W are arranged are pixels in which color filter layers are not present and which are used to display white. The color filter layers 16R, 16G, 16B, and 16W are arranged along the periphery of the color filter substrate 15d, and just the color filter layers 16R, 16G, and 16B are arranged in the remaining portion of the color filter substrate 15b.

The auxiliary illumination unit 7h includes a portion of the display light sources (LEDs 9W). Therefore, in the mirror display according to Embodiment 10, the LEDs 9W that are used as part of the auxiliary illumination unit 7h are not easily visible from the viewing side, thereby making it possible to improve the design aesthetics of the overall mirror display.

In mirror mode, the auxiliary illumination unit 7h emits the light from the LEDs 9W that are used as part of the auxiliary illumination unit 7h out towards the viewing side through the portion in which the color filter layers 16R, 16G, 16B, and 16W are arranged. Like in Embodiment 9, letting the total amount of light that enters the color filter substrate 15d be 1, the amount of light that passes through the portion in which just the color filter layers 16R, 16G, and 16B are arranged (a fourth portion) is equal to $\frac{1}{3} \times \frac{1}{3} + \frac{1}{3} \times \frac{1}{3} + \frac{1}{3} \times \frac{1}{3} = \frac{1}{3}$. Meanwhile, in the pixels in which the color filter layers 16R, 16G, 16B, and 16W are arranged, each color filter layer occupies ¼ of the area of the overall corresponding pixel. Therefore, the amount of light that passes through the portion in which the color filter layers 16R, 16G, 16B, and 16W are arranged is equal to $\frac{1}{4} \times \frac{1}{3} + \frac{1}{4} \times \frac{1}{3} + \frac{1}{4} \times \frac{1}{3} + \frac{1}{4} = \frac{1}{2}$. As a result, the amount of light that passes through the portion in which the color filter layers 16R, 16G, 16B, and 16W are arranged is 1.5 times greater than the amount of light that passes through the portion in which just the color filter layers 16R, 16G, and 16B are arranged. Therefore, the brightness (as measured on the viewing side) of the light that passes through the auxiliary illumination unit 7h is greater than the brightness of the light from the liquid crystal display device 2d when in the white display state. In this way, the mirror display according to Embodiment 10 makes it possible to sufficiently improve the visibility of reflected images in mirror mode in dark environments.

(Embodiment 11)

Embodiment 11 also relates to the second mirror display according to the present invention. In Embodiment 11, an auxiliary illumination unit emits light from a portion of the display light sources of a liquid crystal display device towards the viewing side through a portion in which a polarizer is not present on the viewing side of a liquid crystal display panel. Except for this aspect of the configuration, the mirror display according to Embodiment 11 is the same as the mirror display according to Embodiment 8, and therefore a description of the identical aspects will be omitted here.

Figure 22:
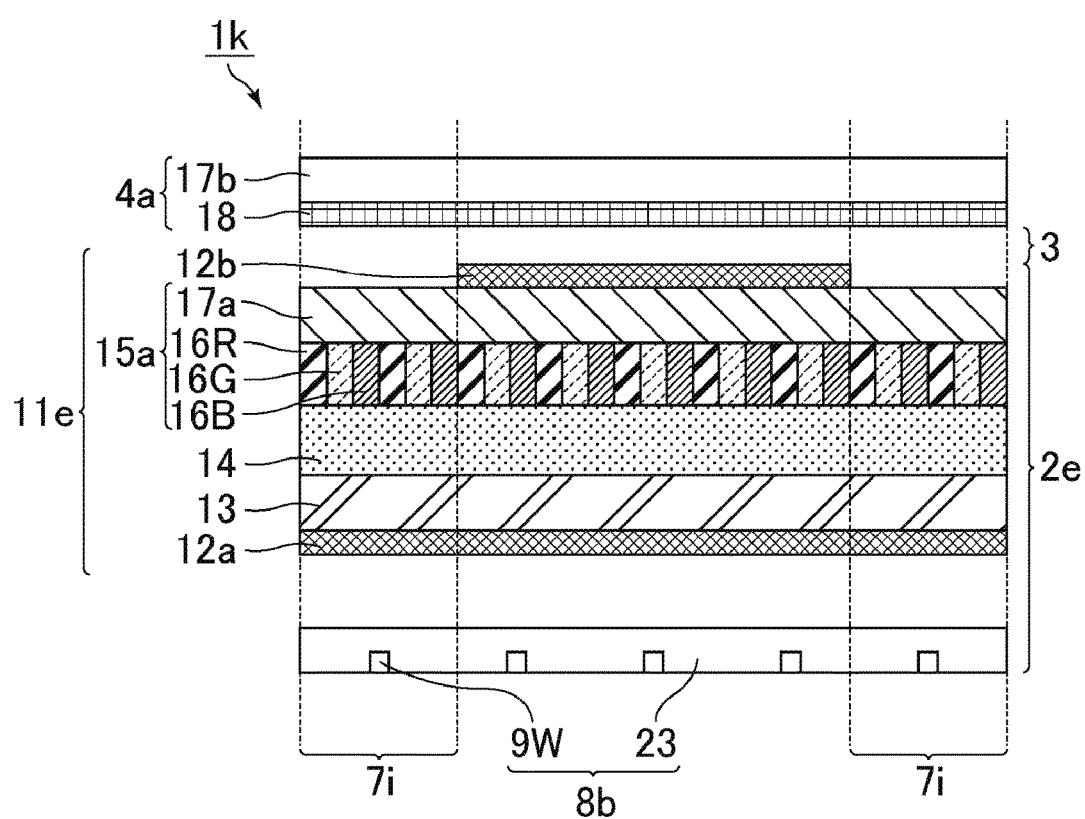
FIG. 22 is a cross-sectional view schematically illustrating a mirror display according to Embodiment 11.

FIG. 22 is a cross-sectional view schematically illustrating the mirror display according to Embodiment 11. As illustrated in FIG. 22, a mirror display 1k includes a liquid crystal display device 2e, an air space 3, and a half mirror plate 4a arranged in that order from the rear side to the viewing side. The liquid crystal display device 2e includes an auxiliary illumination unit 7i, which is arranged along the periphery of a display region AR1 (mirror region AR2).

The liquid crystal display device 2e also includes a backlight unit 8b and a liquid crystal display panel 11e arranged in that order from the rear side to the viewing side.

The liquid crystal display panel 11e includes an absorptive polarizer 12a, a thin-film transistor array substrate 13, a liquid crystal layer 14, a color filter substrate 15a, and an absorptive polarizer 12b that are arranged in that order from the rear side to the viewing side. The absorptive polarizer 12b is not formed along the periphery of the liquid crystal display panel 11e. The display mode and drive method of the liquid crystal display panel 11e are the same as in Embodiment 8.

The auxiliary illumination unit 7i includes a portion of the display light sources (LEDs 9W). Therefore, in the mirror display according to Embodiment 11, the LEDs 9W that are used as part of the auxiliary illumination unit 7i are not easily visible from the viewing side, thereby making it possible to improve the design aesthetics of the overall mirror display.

In mirror mode, the auxiliary illumination unit 7i emits the light from the LEDs 9W that are used as part of the auxiliary illumination unit 7i out towards the viewing side through the portion (a fifth portion) in which the absorptive polarizer 12b is not present. The absorptive polarizers 12a and 12b are each configured to have a single transmittance of 42% and a parallel transmittance of 37%. As a result, the amount of light that passes through the portion in which the absorptive polarizer 12b is not present is 1.14 (=42%/37%≈1.14) times greater than the amount of light that passes through the portion in which the absorptive polarizer 12b is present. Therefore, the brightness (as measured on the viewing side) of the light that passes through the auxiliary illumination unit 7i is greater than the brightness of the light from the liquid crystal display device 2e when in the white display state. In this way, the mirror display according to Embodiment 11 makes it possible to sufficiently improve the visibility of reflected images in mirror mode in dark environments.

(Embodiment 12)

Embodiment 12 also relates to the second mirror display according to the present invention. In Embodiment 12, an auxiliary illumination unit emits light from a portion of the display light sources of a liquid crystal display device towards the viewing side through a portion in which a polarizer is not present on the rear side of a liquid crystal display panel. Except for this aspect of the configuration, the mirror display according to Embodiment 12 is the same as the mirror display according to Embodiment 8, and therefore a description of the identical aspects will be omitted here.

Figure 23:
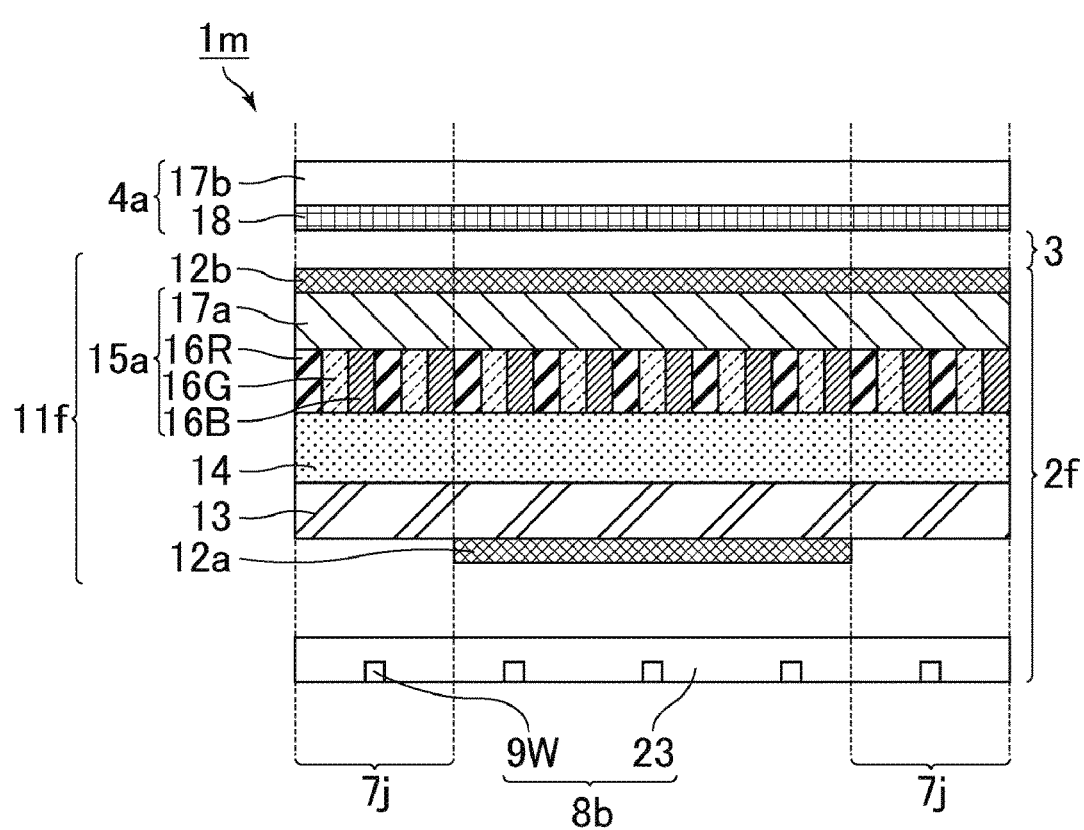
FIG. 23 is a cross-sectional view schematically illustrating a mirror display according to Embodiment 12.

FIG. 23 is a cross-sectional view schematically illustrating the mirror display according to Embodiment 12. As illustrated in FIG. 23, a mirror display 1m includes a liquid crystal display device 2f, an air space 3, and a half mirror plate 4a arranged in that order from the rear side to the viewing side. The liquid crystal display device 2f includes an auxiliary illumination unit 7j, which is arranged along the periphery of a display region AR1 (mirror region AR2).

The liquid crystal display device 2f also includes a backlight unit 8b and a liquid crystal display panel 11f arranged in that order from the rear side to the viewing side.

The liquid crystal display panel 11f includes an absorptive polarizer 12a, a thin-film transistor array substrate 13, a liquid crystal layer 14, a color filter substrate 15a, and an absorptive polarizer 12b that are arranged in that order from the rear side to the viewing side. The absorptive polarizer 12a is not formed along the periphery of the liquid crystal display panel 11f. The display mode and drive method of the liquid crystal display panel 11f are the same as in Embodiment 8.

The auxiliary illumination unit 7j includes a portion of the display light sources (LEDs 9W). Therefore, in the mirror display according to Embodiment 12, the LEDs 9W that are used as part of the auxiliary illumination unit 7j are not easily visible from the viewing side, thereby making it possible to improve the design aesthetics of the overall mirror display.

In mirror mode, the auxiliary illumination unit 7j emits the light from the LEDs 9W that are used as part of the auxiliary illumination unit 7j out towards the viewing side through the portion (a fifth portion) in which the absorptive polarizer 12a is not present. The absorptive polarizers 12a and 12b are each configured to have a single transmittance of 42% and a parallel transmittance of 37%. As a result, the amount of light that passes through the portion in which the absorptive polarizer 12a is not present is 1.14 (=42%/37%≈1.14) times greater than the amount of light that passes through the portion in which the absorptive polarizer 12a is present. Therefore, the brightness (as measured on the viewing side) of the light that passes through the auxiliary illumination unit 7j is greater than the brightness of the light from the liquid crystal display device 2f when in the white display state. In this way, the mirror display according to Embodiment 12 makes it possible to sufficiently improve the visibility of reflected images in mirror mode in dark environments. Moreover, using red, green, and blue LEDs instead of the LEDs 9W makes it possible to adjust the color of the auxiliary illumination unit 7j.

(Embodiment 13)

Embodiment 13 also relates to the second mirror display according to the present invention. In Embodiment 13, an auxiliary illumination unit emits light from a portion of the display light sources of a liquid crystal display device towards the viewing side through a portion in which polarizers are not present on the viewing side nor the rear side of a liquid crystal display panel. Except for this aspect of the configuration, the mirror display according to Embodiment 13 is the same as the mirror display according to Embodiment 8, and therefore a description of the identical aspects will be omitted here.

Figure 24:
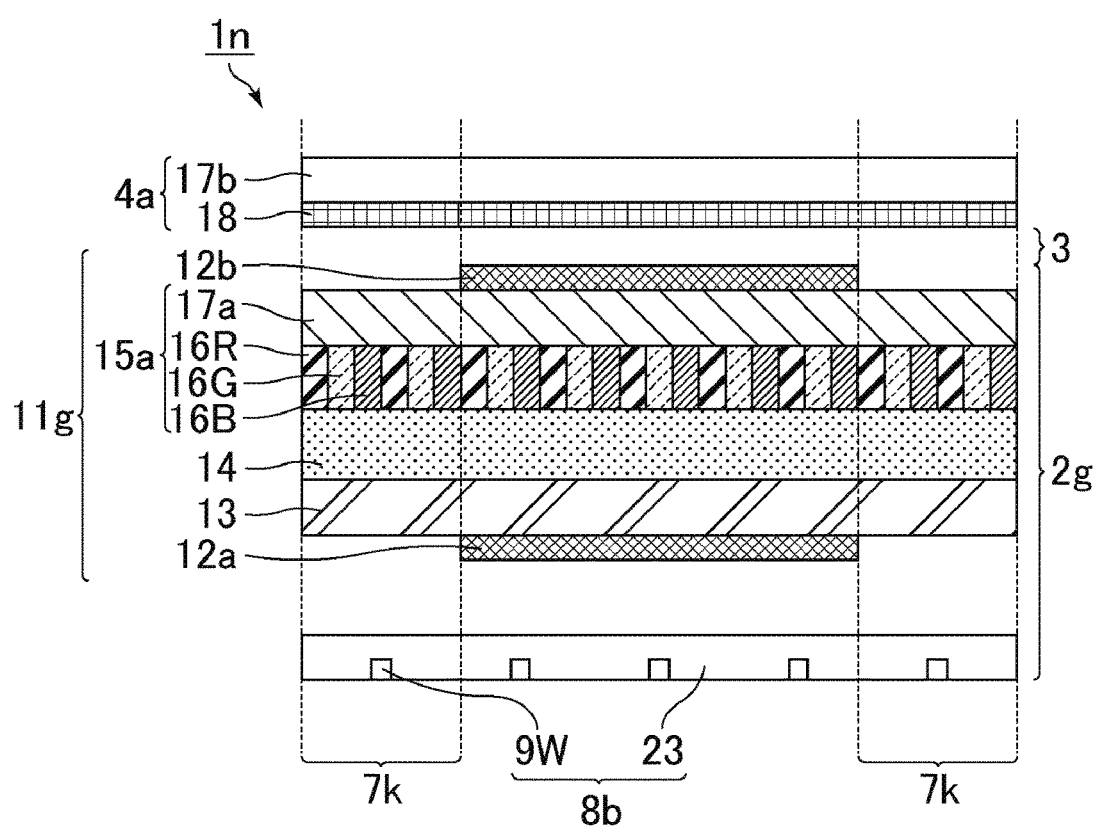
FIG. 24 is a cross-sectional view schematically illustrating a mirror display according to Embodiment 13.

FIG. 24 is a cross-sectional view schematically illustrating the mirror display according to Embodiment 13. As illustrated in FIG. 24, a mirror display 1n includes a liquid crystal display device 2g, an air space 3, and a half mirror plate 4a arranged in that order from the rear side to the viewing side. The liquid crystal display device 2g includes an auxiliary illumination unit 7k, which is arranged along the periphery of a display region AR1 (mirror region AR2).

The liquid crystal display device 2g also includes a backlight unit 8b and a liquid crystal display panel 11g arranged in that order from the rear side to the viewing side.

The liquid crystal display panel 11g includes an absorptive polarizer 12a, a thin-film transistor array substrate 13, a liquid crystal layer 14, a color filter substrate 15a, and an absorptive polarizer 12b that are arranged in that order from the rear side to the viewing side. The absorptive polarizers 12a and 12b are not formed along the periphery of the liquid crystal display panel 11g. The display mode and drive method of the liquid crystal display panel 11g are the same as in Embodiment 8.

The auxiliary illumination unit 7k includes a portion of the display light sources (LEDs 9W). Therefore, in the mirror display according to Embodiment 13, the LEDs 9W that are used as part of the auxiliary illumination unit 7k are not easily visible from the viewing side, thereby making it possible to improve the design aesthetics of the overall mirror display.

In mirror mode, the auxiliary illumination unit 7k emits the light from the LEDs 9W that are used as part of the auxiliary illumination unit 7k out towards the viewing side through the portion (a fifth portion) in which the absorptive polarizers 12a and 12b are not present. The absorptive polarizers 12a and 12b are each configured to have a parallel transmittance of 37%. As a result, the amount of light that passes through the portion in which the absorptive polarizers 12a and 12b are not present is 2.7 (=100%/37%≈2.7) times greater than the amount of light that passes through the portion in which the absorptive polarizers 12a and 12b are present. Therefore, the brightness (as measured on the viewing side) of the light that passes through the auxiliary illumination unit 7k is greater than the brightness of the light from the liquid crystal display device 2g when in the white display state. In this way, the mirror display according to Embodiment 13 makes it possible to sufficiently improve the visibility of reflected images in mirror mode in dark environments. Moreover, using red, green, and blue LEDs instead of the LEDs 9W makes it possible to adjust the color of the auxiliary illumination unit 7k.

(Embodiment 14)

Embodiment 14 also relates to the second mirror display according to the present invention. In Embodiment 14, an auxiliary illumination unit emits light from a portion of the display light sources of a liquid crystal display device towards the viewing side through a portion in which color filter layers are not present and a portion in which polarizers are not present on the viewing side nor the rear side of a liquid crystal display panel. Except for this aspect of the configuration, the mirror display according to Embodiment 14 is the same as the mirror display according to Embodiment 8, and therefore a description of the identical aspects will be omitted here.

Figure 25:
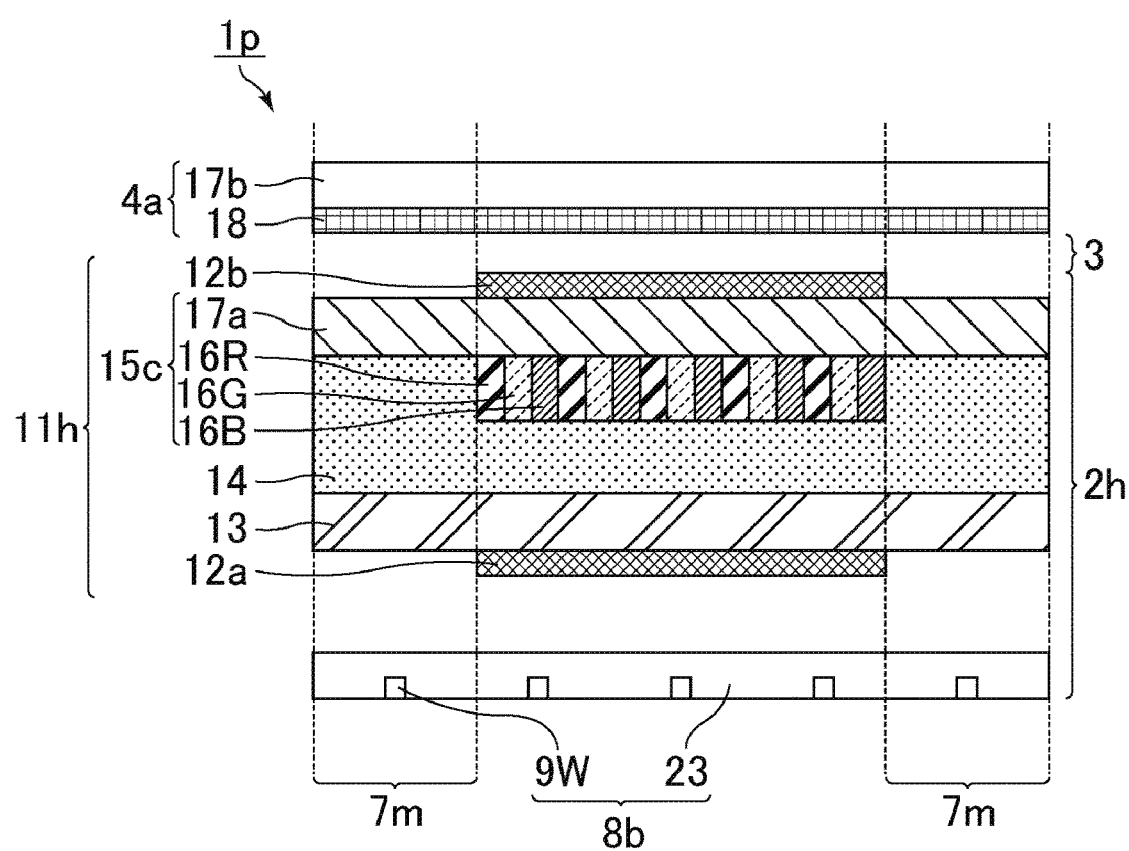
FIG. 25 is a cross-sectional view schematically illustrating a mirror display according to Embodiment 14.

FIG. 25 is a cross-sectional view schematically illustrating the mirror display according to Embodiment 14. As illustrated in FIG. 25, a mirror display 1p includes a liquid crystal display device 2h, an air space 3, and a half mirror plate 4a arranged in that order from the rear side to the viewing side. The liquid crystal display device 2h includes an auxiliary illumination unit 7m, which is arranged along the periphery of a display region AR1 (mirror region AR2).

The liquid crystal display device 2h also includes a backlight unit 8b and a liquid crystal display panel 11h arranged in that order from the rear side to the viewing side.

The liquid crystal display panel 11h includes an absorptive polarizer 12a, a thin-film transistor array substrate 13, a liquid crystal layer 14, a color filter substrate 15c, and an absorptive polarizer 12b that are arranged in that order from the rear side to the viewing side. Neither color filter layers nor the absorptive polarizers 12a and 12b are formed along the periphery of the liquid crystal display panel 11h. The display mode and drive method of the liquid crystal display panel 11h are the same as in Embodiment 8.

The auxiliary illumination unit 7m includes a portion of the display light sources (LEDs 9W). Therefore, in the mirror display according to Embodiment 14, the LEDs 9W that are used as part of the auxiliary illumination unit 7m are not easily visible from the viewing side, thereby making it possible to improve the design aesthetics of the overall mirror display.

In mirror mode, the auxiliary illumination unit 7m emits the light from the LEDs 9W that are used as part of the auxiliary illumination unit 7m out towards the viewing side through the portion (a second portion) in which color filter layers are not present and the portion (a fifth portion) in which the absorptive polarizers 12a and 12b are not present. Like in Embodiment 9, the amount of light that passes through the portion in which the color filter layers are not present is three times greater than the amount of light that passes through the portion in which the color filter layers 16R, 16G, and 16B are arranged. Moreover, like in Embodiment 13, the amount of light that passes through the portion in which the absorptive polarizers 12a and 12b are not present is 2.7 times greater than the amount of light that passes through the portion in which the absorptive polarizers 12a and 12b are present. As a result, the amount of light that passes through the portion in which the color filter layers are not present and the portion in which the absorptive polarizers 12a and 12b are not present is 8.1 times greater than the amount of light that passes through the portion in which color filter layers 16R, 16G, and 16B are arranged and the portion in which the absorptive polarizers 12a and 12b are present. Therefore, the brightness (as measured on the viewing side) of the light that passes through the auxiliary illumination unit 7m is greater than the brightness of the light from the liquid crystal display device 2h when in the white display state. In this way, the mirror display according to Embodiment 14 makes it possible to sufficiently improve the visibility of reflected images in mirror mode in dark environments. Moreover, using red, green, and blue LEDs instead of the LEDs 9W makes it possible to adjust the color of the auxiliary illumination unit 7m.

(Embodiment 15)

Embodiment 15 also relates to the second mirror display according to the present invention. In Embodiment 15, an auxiliary illumination unit emits light towards the viewing side from a portion in which there are more display light sources of a liquid crystal display device arranged than in other portions. Except for this aspect of the configuration, the mirror display according to Embodiment 15 is the same as the mirror display according to Embodiment 8, and therefore a description of the identical aspects will be omitted here.

Figure 26:
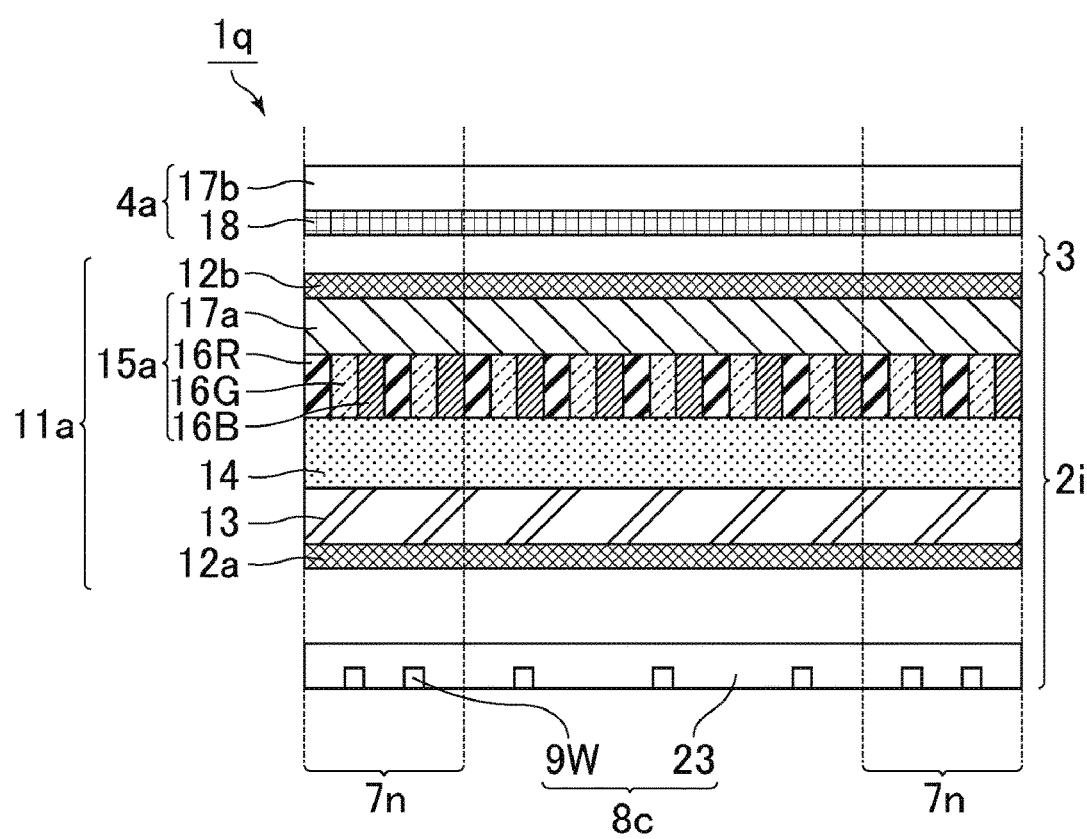
FIG. 26 is a cross-sectional view schematically illustrating a mirror display according to Embodiment 15.

FIG. 26 is a cross-sectional view schematically illustrating the mirror display according to Embodiment 15. As illustrated in FIG. 26, a mirror display 1q includes a liquid crystal display device 2i, an air space 3, and a half mirror plate 4a arranged in that order from the rear side to the viewing side. The liquid crystal display device 2i includes an auxiliary illumination unit 7n, which is arranged along the periphery of a display region AR1 (mirror region AR2).

The liquid crystal display device 2i also includes a backlight unit 8c and a liquid crystal display panel 11a arranged in that order from the rear side to the viewing side.

The backlight unit 8c is a direct-lit backlight device that includes white LEDs 9W that function as a display light source and a diffusion plate 23 that is arranged covering the LEDs 9W. Along the periphery of the backlight unit 8c, twice as many LEDs 9W as in other portions are arranged.

The auxiliary illumination unit 7n includes the portion in which there are more of the display light sources (LEDs 9W) arranged than in other portions. Therefore, in the mirror display according to Embodiment 15, the LEDs 9W that are used as part of the auxiliary illumination unit 7n are not easily visible from the viewing side, thereby making it possible to improve the design aesthetics of the overall mirror display.

In mirror mode, the auxiliary illumination unit 7n emits the light from the portion (a sixth portion) in which there are more of the display light sources (LEDs 9W) arranged than in other portions towards the viewing side through the liquid crystal display panel 11a and the half mirror plate 4a. There are twice as many of the LEDs 9W that are used as part of the auxiliary illumination unit 7n than there are LEDs arranged in other portions, and therefore the former group of LEDs produce twice as much light as the latter group. Therefore, the brightness (as measured on the viewing side) of the light that passes through the auxiliary illumination unit 7n is greater than the brightness of the light from the liquid crystal display device 2i when in the white display state. In this way, the mirror display according to Embodiment 15 makes it possible to sufficiently improve the visibility of reflected images in mirror mode in dark environments.

(Embodiment 16)

Embodiment 16 also relates to the second mirror display according to the present invention. In Embodiment 16, an auxiliary illumination unit emits light from a portion in which display light sources of colors other than white are arranged towards the viewing side through a portion in which color filter layers are not present and a portion in which polarizers are not present on the viewing side nor the rear side of a liquid crystal display panel. Except for the configuration of the backlight unit, the mirror display according to Embodiment 16 is the same as the mirror display according to Embodiment 14, and therefore a description of the identical aspects will be omitted here.

Figure 27:
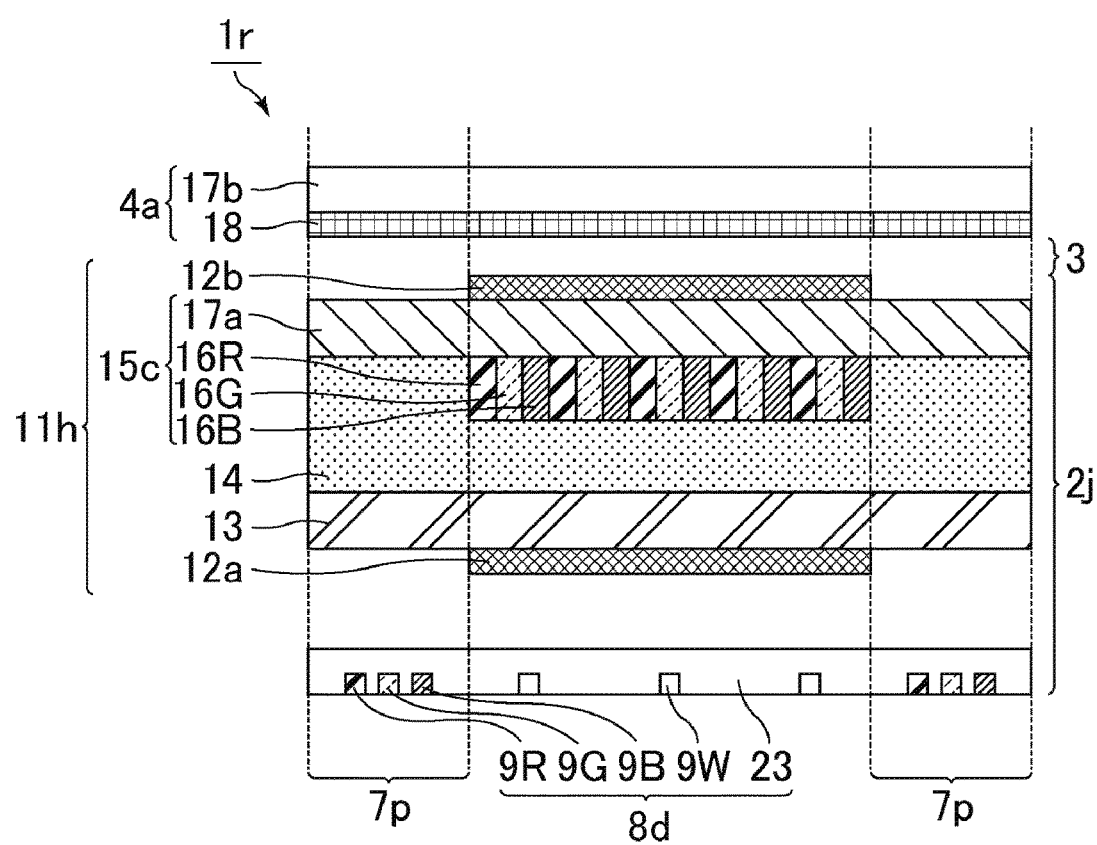
FIG. 27 is a cross-sectional view schematically illustrating a mirror display according to Embodiment 16.

FIG. 27 is a cross-sectional view schematically illustrating the mirror display according to Embodiment 16. As illustrated in FIG. 27, a mirror display 1r includes a liquid crystal display device 2j, an air space 3, and a half mirror plate 4a arranged in that order from the rear side to the viewing side. The liquid crystal display device 2j includes an auxiliary illumination unit 7p, which is arranged along the periphery of a display region AR1 (mirror region AR2).

The liquid crystal display device 2j also includes a backlight unit 8d and a liquid crystal display panel 11h arranged in that order from the rear side to the viewing side.

The backlight unit 8d is a direct-lit backlight device that includes white LEDs 9W, red LEDs 9R, green LEDs 9G, and blue LEDs 9B that function as a display light source and a diffusion plate 23 that is arranged covering the LEDs. The LEDs 9R, 9G, and 9B are arranged along the periphery of the backlight unit 8d, and the LEDs 9W are arranged in the remaining portion of the backlight unit 8d.

The auxiliary illumination unit 7p includes the portion in which the LEDs 9R, 9G, and 9B are arranged. Therefore, in the mirror display according to Embodiment 16, the LEDs 9R, 9G, and 9B that are used as part of the auxiliary illumination unit 7p are not easily visible from the viewing side, thereby making it possible to improve the design aesthetics of the overall mirror display.

In mirror mode, the auxiliary illumination unit 7p emits the light from the portion (a seventh portion) in which the LEDs 9R, 9G, and 9B are arranged out towards the viewing side through the portion (a second portion) in which color filter layers are not present and the portion (a fifth portion) in which absorptive polarizers 12a and 12b are not present Like in Embodiment 14, the amount of light that passes through the portion in which the color filter layers are not present and the portion in which the absorptive polarizers 12a and 12b are not present is 8.1 times greater than the amount of light that passes through the portion in which color filter layers 16R, 16G, and 16B are arranged and the portion in which the absorptive polarizers 12a and 12b are present. Therefore, the brightness (as measured on the viewing side) of the light that passes through the auxiliary illumination unit 7p is greater than the brightness of the light from the liquid crystal display device 2j when in the white display state. In this way, the mirror display according to Embodiment 16 makes it possible to sufficiently improve the visibility of reflected images in mirror mode in dark environments. Moreover, using the LEDs 9R, 9G, and 9B makes it possible to adjust the color of the auxiliary illumination unit 7p.

(Embodiment 17)

Embodiment 17 also relates to the second mirror display according to the present invention. In Embodiment 17, the size of a liquid crystal display panel is less than the size of a backlight unit when viewed in a plan view from the viewing side. Moreover, an auxiliary illumination unit emits light from a portion in which display light sources of colors other than white are arranged towards the viewing side through a region outside of a region in which the liquid crystal display panel and the backlight unit face one another. Except for the size of the liquid crystal display panel, the mirror display according to Embodiment 17 is the same as the mirror display according to Embodiment 16, and therefore a description of the identical aspects will be omitted here.

Figure 28:
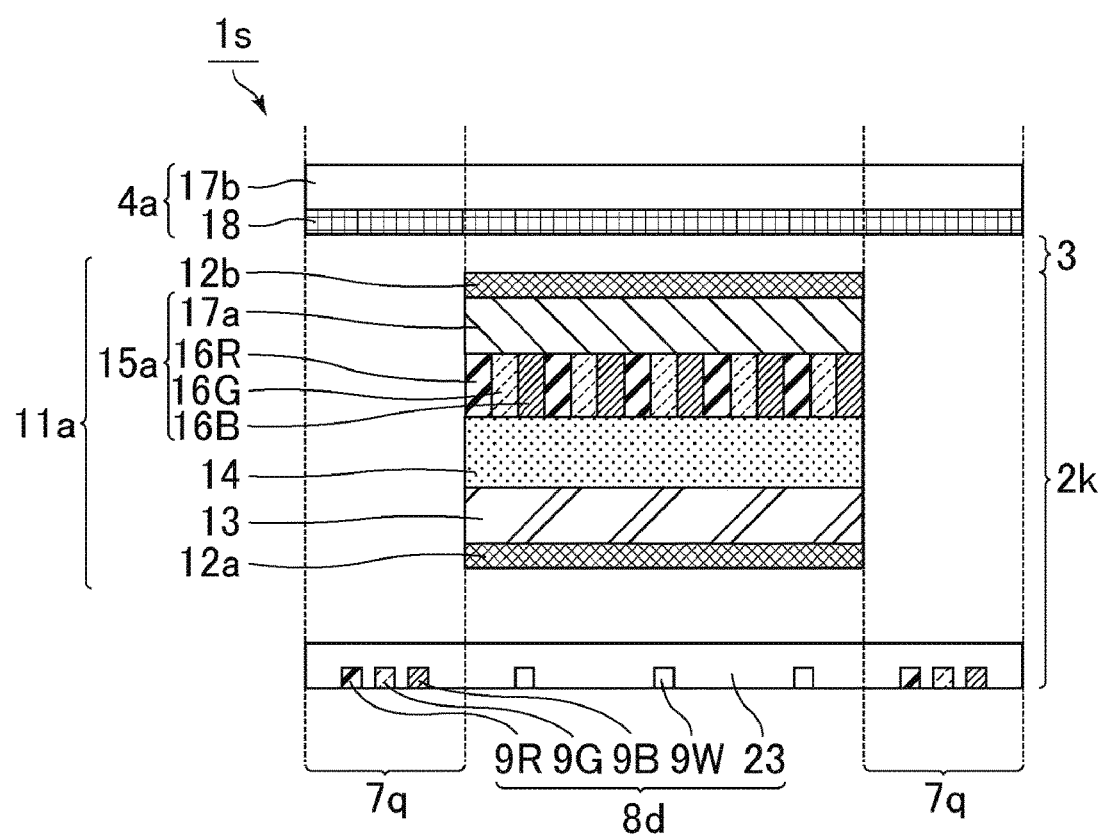
FIG. 28 is a cross-sectional view schematically illustrating a mirror display according to Embodiment 17.

FIG. 28 is a cross-sectional view schematically illustrating the mirror display according to Embodiment 17. As illustrated in FIG. 28, a mirror display is includes a liquid crystal display device 2k, an air space 3, and a half mirror plate 4a arranged in that order from the rear side to the viewing side. The liquid crystal display device 2k includes an auxiliary illumination unit 7q, which is arranged along the periphery of a display region AR1 (mirror region AR2).

The liquid crystal display device 2k also includes a backlight unit 8d and a liquid crystal display panel 11a arranged in that order from the rear side to the viewing side.

The size of the liquid crystal display panel 11a is smaller than the size of the backlight unit 8d when viewed in a plan view from the viewing side.

The auxiliary illumination unit 7q is arranged in a region outside of the region in which the liquid crystal display panel 11a and the backlight unit 8d face one another and includes a portion in which LEDs 9R, 9G, and 9B are arranged. Therefore, in the mirror display according to Embodiment 17, the LEDs 9R, 9G, and 9B that are used as part of the auxiliary illumination unit 7q are not easily visible from the viewing side, thereby making it possible to improve the design aesthetics of the overall mirror display.

In mirror mode, the auxiliary illumination unit 7q emits light from the portion (a seventh portion) in which the LEDs 9R, 9G, and 9B are arranged towards the viewing side through a region outside of the region in which the liquid crystal display panel 11a and the backlight unit 8d face one another. As a result, like in Embodiment 14, the amount of light that passes through the region outside of the region in which the liquid crystal display panel 11a and the backlight unit 8d face one another (that is, the amount of light that passes through the portion in which color filter layers are not present and the portion in which absorptive polarizers 12a and 12b are not present) is 8.1 times greater than the amount of light that passes through the portion in which color filter layers 16R, 16G, and 16B are arranged and the portion in which the absorptive polarizers 12a and 12b are present. Therefore, the brightness (as measured on the viewing side) of the light that passes through the auxiliary illumination unit 7q is greater than the brightness of the light from the liquid crystal display device 2k when in the white display state. In this way, the mirror display according to Embodiment 17 makes it possible to sufficiently improve the visibility of reflected images in mirror mode in dark environments. Moreover, using the LEDs 9R, 9G, and 9B makes it possible to adjust the color of the auxiliary illumination unit 7q. Furthermore, the mirror display according to Embodiment 17 can be configured simply by preparing a liquid crystal display panel 11a that is smaller in size than the backlight unit 8d. Therefore, like in Embodiments 8 to 16, no changes need to be made to the process for manufacturing the liquid crystal display panel, which is advantageous from a production cost perspective.

(Embodiment 18)

Embodiment 18 also relates to the second mirror display according to the present invention. In Embodiment 18, a dielectric multilayer film is used for the half mirror layer. Moreover, the size of a liquid crystal display panel is less than the size of a backlight unit when viewed in a plan view from the viewing side. Furthermore, an auxiliary illumination unit emits light from a portion in which display light sources of colors other than white are arranged towards the viewing side through a region outside of a region in which the liquid crystal display panel and the backlight unit face one another. Except for the half mirror layer, the mirror display according to Embodiment 18 is the same as the mirror display according to Embodiment 17, and therefore a description of the identical aspects will be omitted here.

Figure 29:
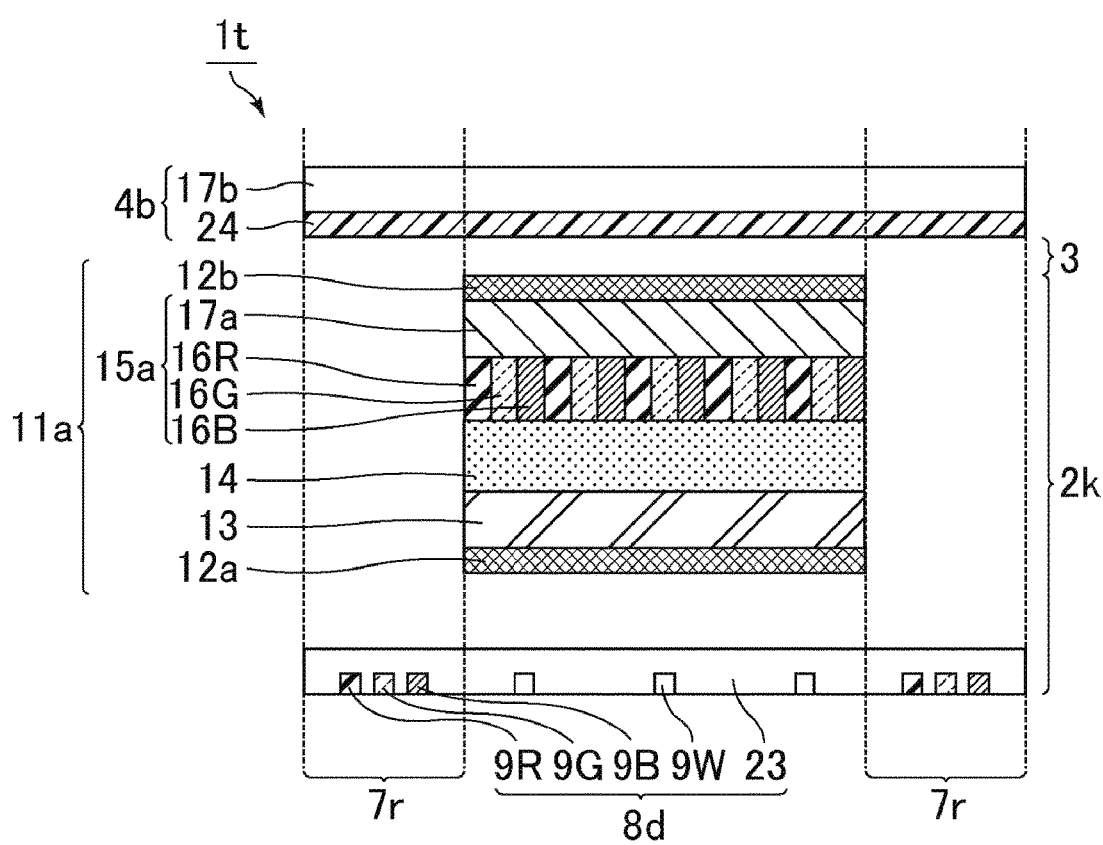
FIG. 29 is a cross-sectional view schematically illustrating a mirror display according to Embodiment 18.

FIG. 29 is a cross-sectional view schematically illustrating the mirror display according to Embodiment 18. As illustrated in FIG. 29, a mirror display 1t includes a liquid crystal display device 2k, an air space 3, and a half mirror plate 4b arranged in that order from the rear side to the viewing side. The liquid crystal display device 2k includes an auxiliary illumination unit 7r, which is arranged along the periphery of a display region AR1 (mirror region AR2).

The half mirror plate 4b includes, arranged in order from the rear side to the viewing side, a dielectric multilayer film 24 that functions as a half mirror layer and a glass substrate 17b that functions as a base material that supports the half mirror layer. The dielectric multilayer film 24 and the glass substrate 17b are fixed together using an adhesive (not illustrated in the figure).

The dielectric multilayer film 24 is a Toray Industries Inc. dielectric multilayer film (product name: PICASUS (registered trademark)). However, any multilayer film produced by layering together dielectric films of different refractive indices to form a mirror in which the reflectance can be set to any desired value by applying the principles of optical interference may be used. Examples of such multilayer films include multilayer films formed by alternately layering together a low refractive index titanium oxide ($TiO_2$) material and a high refractive index silicon dioxide ($SiO_2$) material, multilayer films formed by alternately layering together two types of PET materials of different refractive indices, and the like.

Like the auxiliary illumination unit 7q of Embodiment 17, the auxiliary illumination unit 7r is arranged in a region outside of the region in which the liquid crystal display panel 11a and the backlight unit 8d face one another and includes a portion (a seventh portion) in which LEDs 9R, 9G, and 9B are arranged. Therefore, the mirror display according to Embodiment 18 makes it possible to achieve the same effects as the mirror display according to Embodiment 17.

The following modifications may be made to the mirror displays according to Embodiments 1 to 18 in order to improve usability.
(a) Including a position sensor that measures the distance to objects on the viewing side (such as viewers) and connecting this position sensor to the auxiliary illumination unit makes it possible to automatically adjust the brightness and color of the light from the auxiliary illumination unit. Moreover, this type of configuration makes it possible to switch between mirror mode and display mode and turn the auxiliary illumination unit ON and OFF accordingly as viewers or the like approach the mirror display.
(b) Including an illuminance sensor that measures the brightness of the ambient environment and connecting this illuminance sensor to the auxiliary illumination unit makes it possible to automatically adjust the brightness of the light from the auxiliary illumination unit.
(c) Including a color sensor that measures the color tones present in the ambient environment and connecting this color sensor to the auxiliary illumination unit makes it possible to automatically adjust the color of the light from the auxiliary illumination unit.
(d) The mirror display may be configured such that the auxiliary illumination unit can be turned ON and OFF using a remote control for the display device.
(e) Including a camera makes it possible for the auxiliary illumination unit to be used as a flash when pictures are taken.
Giving the auxiliary illumination unit features for adjusting the color and brightness of the light emitted therefrom in accordance with the ambient environment (as described above in (b) and
(c)) makes it possible to create mirror mode effects that match the ambiance of the ambient environment. For example, lighting effects that reproduce the ambiance (in brightness and color) of a daytime shopping mall or a nighttime party venue can be created, and women can coordinate their makeup products with the resulting ambiance.

COMPARISON EXAMPLE 1

Comparison Example 1 relates to a mirror display configuration in which the mirror display according to Embodiment 1 does not include an auxiliary illumination unit.

Figure 30:
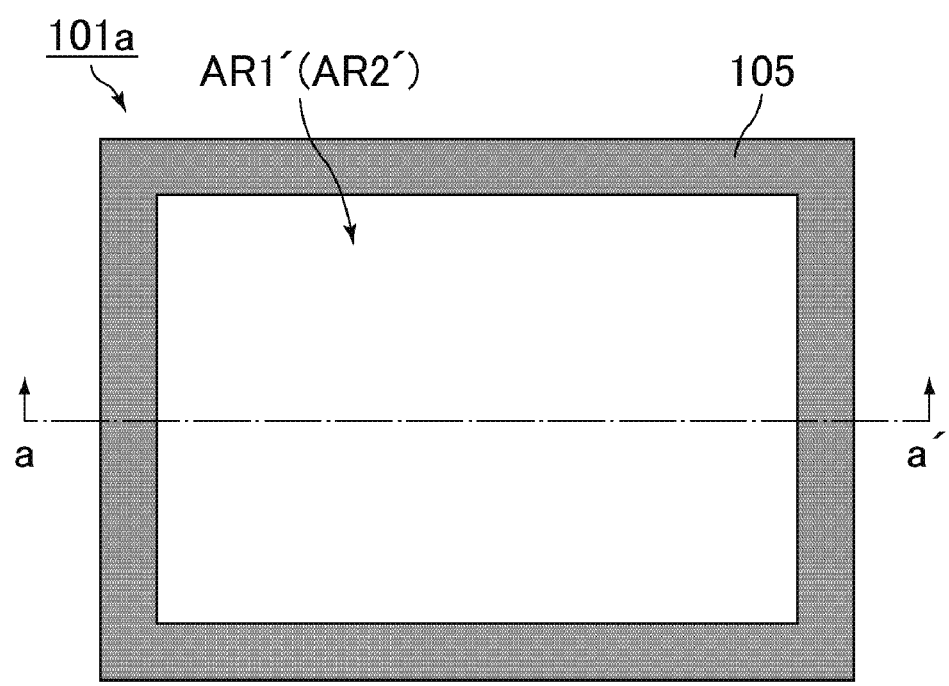
FIG. 30 is a plan view schematically illustrating a mirror display according to Comparison Example 1.

FIG. 30 is a plan view schematically illustrating the mirror display according to Comparison Example 1. As illustrated in FIG. 30, a mirror display 101a includes, in a region surrounded by a case 105, a display region AR1' and a mirror region AR2' that are the same size.

Figure 31:
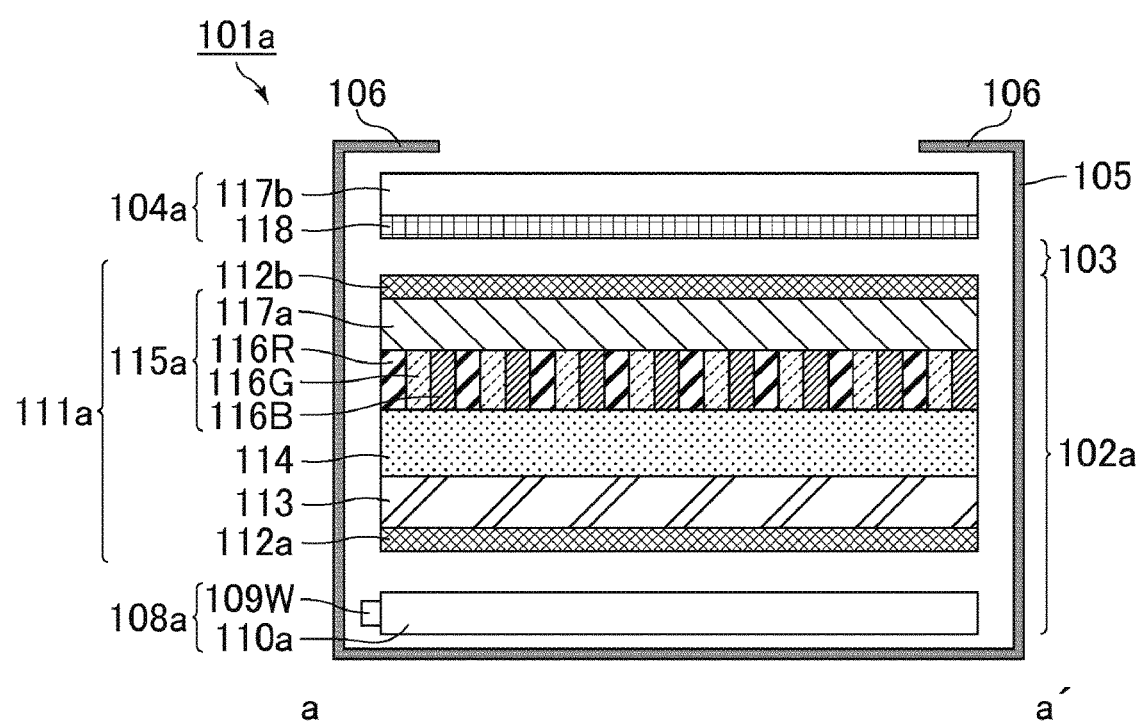
FIG. 31 is a cross-sectional view schematically illustrating a cross section taken along line a-a' in FIG. 30.

FIG. 31 is a cross-sectional view schematically illustrating a cross section taken along line a-a' in FIG. 30. As illustrated in FIG. 31, the mirror display 101a includes a liquid crystal display device 102a, an air space 103, and a half mirror plate 104a arranged in that order from the rear side to the viewing side. The mirror display 101a also includes the case 105, which supports the liquid crystal display device 102a and the half mirror plate 104a. The size of the liquid crystal display device 102a is the same as the size of the half mirror plate 104a when viewed in a plan view from the viewing side. The liquid crystal display device 102a and the half mirror plate 104a are fixed together by a pair of aluminum rails that are attached in a frame shape to the top and bottom edges of the liquid crystal display device 102a and engage with the top and bottom edges of the half mirror plate 104a. The air space 103 is a small gap formed between the liquid crystal display device 102a and the half mirror plate 104a.

The liquid crystal display device 102a includes a backlight unit 108a and a liquid crystal display panel 111a arranged in that order from the rear side to the viewing side.

The backlight unit 108a is an edge-lit backlight device that includes a light guide plate 110a and white LEDs 109W that are arranged along an edge of the light guide plate 110a and function as the display light source. The light guide plate 110a is made from an acrylic resin. The LEDs 109W are constituted by an LED backlight unit of the type used in Sharp Corporation liquid crystal televisions (such as the LC-20F5-B).

The liquid crystal display panel 111a includes an absorptive polarizer 112a, a thin-film transistor array substrate 113, a liquid crystal layer 114, a color filter substrate 115a, and an absorptive polarizer 112b that are arranged in that order from the rear side to the viewing side. The liquid crystal display panel 111a is a VA display mode panel. The liquid crystal display panel 111a is an active matrix-driven panel.

In the thin-film transistor array substrate 113, the leads of a plurality of thin-film transistor elements or the like (not illustrated in the figure) are arranged on top of a glass substrate. The semiconductor layers of the thin-film transistor elements are made from amorphous silicon.

The color filter substrate 115a includes a glass substrate 117a and color filter layers 116R (red), 116G (green), and 116B (blue) that are arranged on the thin-film transistor array substrate 113 side of the glass substrate 117a.

The liquid crystal layer 114 is sandwiched between the thin-film transistor array substrate 113 and the color filter substrate 115a, and the thin-film transistor array substrate 113 and the color filter substrate 115a are fixed together using a sealing material (not illustrated in the figure).

The absorptive polarizer 112a is fixed to the rear side of the thin-film transistor array substrate 113 using an adhesive (not illustrated in the figure). The absorptive polarizer 112b is fixed to the viewing side of the color filter substrate 115a using an adhesive (not illustrated in the figure). The absorptive polarizers 112a and 112b are arranged such that the absorption axes thereof are orthogonal to one another.

The half mirror plate 104a includes, arranged in order from the rear side to the viewing side, a reflective polarizer 118 that functions as a half mirror layer and a glass substrate 117b that functions as a base material that supports the half mirror layer. The reflective polarizer 118 and the glass substrate 117b are fixed together using an adhesive (not illustrated in the figure). The reflective polarizer 118 and the absorptive polarizer 112b are arranged such that the transmission axes thereof are parallel to one another.

A Sumitomo 3M reflective multilayer polarizer (product name: DBEF) is used for the reflective polarizer 118.

The glass substrate 117b is made from soda-lime glass and has a thickness of 3.2 mm.

The case 105 is made from a black, light-shielding plastic resin material. The case 105 includes an outer frame 106 that covers the edges of the front surface of the half mirror plate 104a.

COMPARISON EXAMPLE 2

Comparison Example 2 relates to a mirror display configuration in which the mirror display according to Embodiment 8 does not include an auxiliary illumination unit. A description of the aspects of the mirror display according to the present comparison example that are identical to the mirror display according to Comparison Example 1 will be omitted here.

Figure 32:
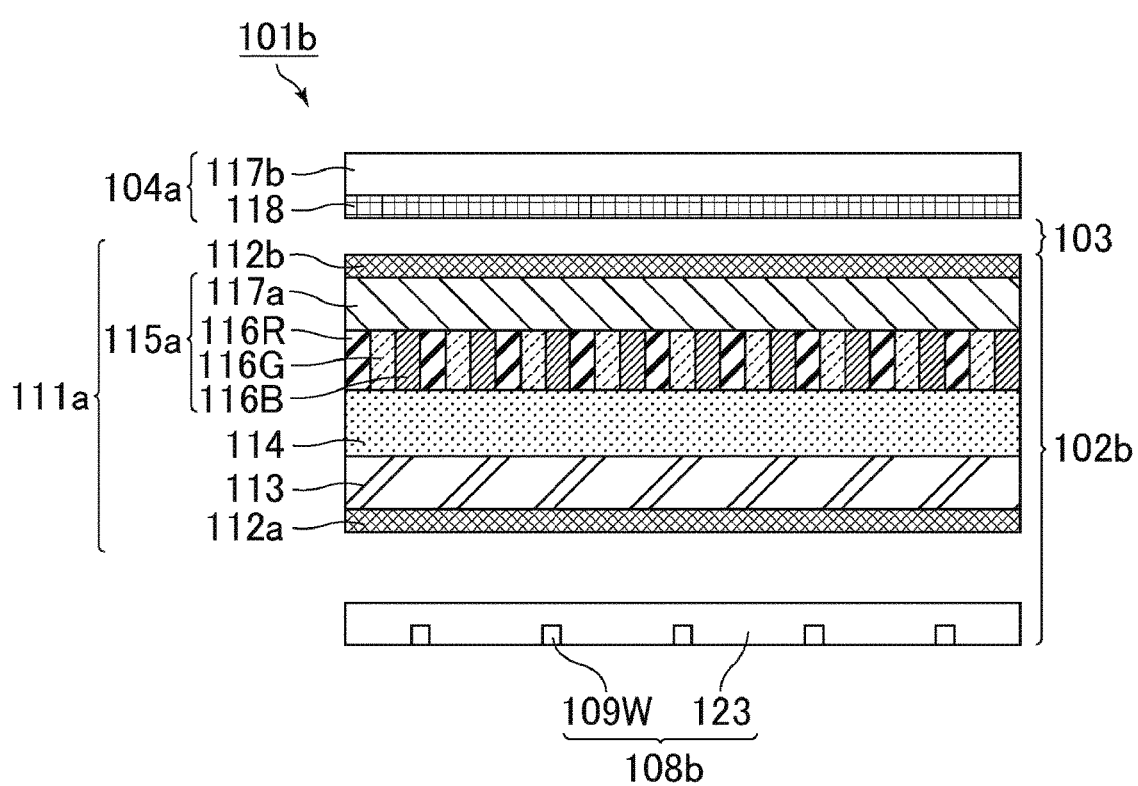
FIG. 32 is a cross-sectional view schematically illustrating a mirror display according to Comparison Example 2.

FIG. 32 is a cross-sectional view schematically illustrating the mirror display according to Comparison Example 2. As illustrated in FIG. 32, a mirror display 101b includes a liquid crystal display device 102b, an air space 103, and a half mirror plate 104a arranged in that order from the rear side to the viewing side. The size of the liquid crystal display device 102b is the same as the size of the half mirror plate 104a when viewed in a plan view from the viewing side. The liquid crystal display device 102b and the half mirror plate 104a are fixed together by a pair of aluminum rails that are attached in a frame shape to the top and bottom edges of the liquid crystal display device 102b and engage with the top and bottom edges of the half mirror plate 104a. The air space 103 is a small gap formed between the liquid crystal display device 102b and the half mirror plate 104a.

The liquid crystal display device 102b also includes a backlight unit 108b and a liquid crystal display panel 111a arranged in that order from the rear side to the viewing side.

The backlight unit 108b is a direct-lit backlight device that includes white LEDs 109W that function as a display light source and a diffusion plate 123 that is arranged covering the LEDs 109W. The diffusion plate 123 is a Sumitomo Chemical Co. diffusion plate (product name: SUMIPEX E (registered trademark)).

COMPARISON EXAMPLE 3

Comparison Example 3 relates to a mirror display in which an auxiliary illumination unit uses the display light emitted from a liquid crystal display device when the liquid crystal display device is in a white display state. Except for the inclusion of the auxiliary illumination unit, the mirror display according to Comparison Example 3 is the same as the mirror display according to Comparison Example 2, and therefore a description of the identical aspects will be omitted here.

Figure 33:
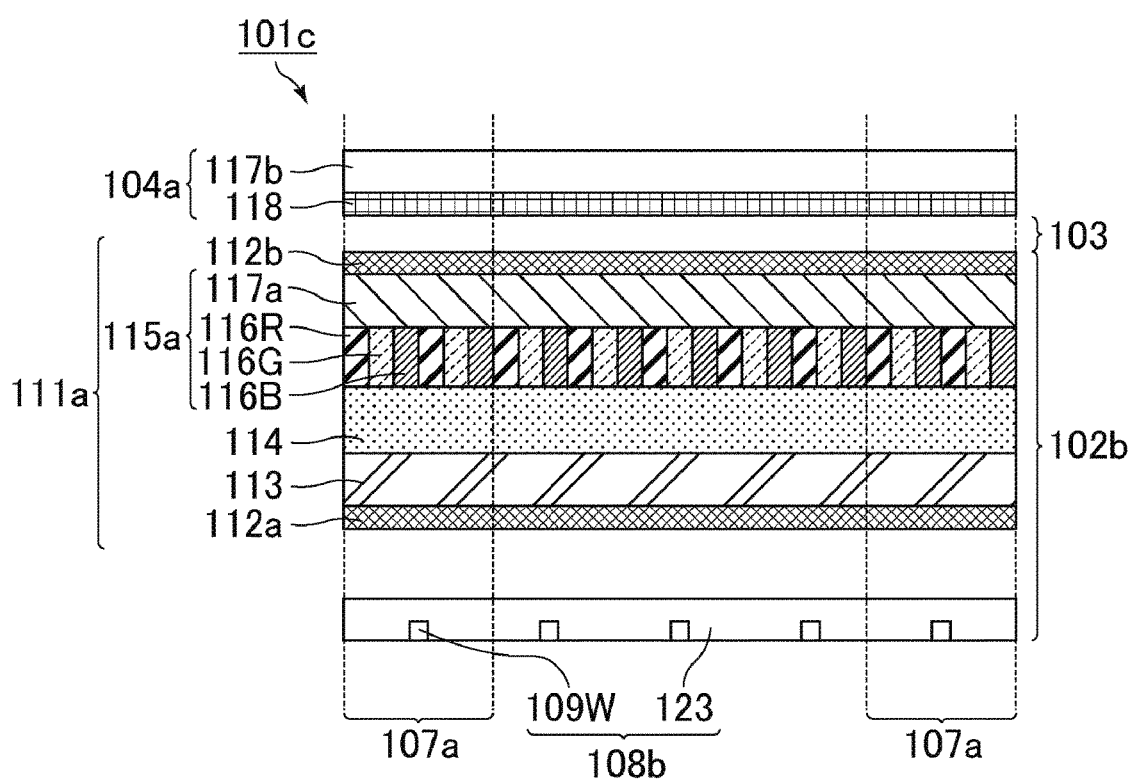
FIG. 33 is a cross-sectional view schematically illustrating a mirror display according to Comparison Example 3.

FIG. 33 is a cross-sectional view schematically illustrating the mirror display according to Comparison Example 3. As illustrated in FIG. 33, a mirror display 101c includes a liquid crystal display device 102b, an air space 103, and a half mirror plate 104a arranged in that order from the rear side to the viewing side. An auxiliary illumination unit 107a is arranged along the periphery of the liquid crystal display device 102b.

In the auxiliary illumination unit 107a, when LEDs 109W that are used as part of the auxiliary illumination unit 107a are illuminated, the liquid crystal display panel 111a is set to a transmissive state, thereby making it possible for light to be emitted towards the viewing side in mirror mode. Because the auxiliary illumination unit 107a uses the display light emitted from the liquid crystal display device 102b when the liquid crystal display device 102b is in a white display state, the brightness of the light emitted from the auxiliary illumination unit 107a is the same as the brightness of the liquid crystal display device 102b when in the white display state. Therefore, in the mirror display according to Comparison Example 3, it is not possible to sufficiently improve the visibility of reflected images in mirror mode in dark environments.

<Results of Mirror Display Evaluation>

Table 1 shows the results of evaluating the visibility of reflected images in mirror mode in dark environments for the mirror displays according to Embodiments 1 to 18 and Comparison Examples 1 to 3.

The visibility of reflected images in mirror mode in dark environments was evaluated using the following method.

(1) Each mirror display was installed in a dark room with an illuminance of 10 lx.

(2) 5 viewers rated the visibility of reflected images in this dark environment on a 7-point scale. The rating scale was defined as follows: 1—Very difficult to see, 2—Difficult to see, 3—Somewhat difficult to see, 4—Neutral, 5—Somewhat easy to see, 6—Easy to see, 7—Very easy to see.

(3) The results of the 5 viewers' evaluations were averaged to determine the visibility for each display.

TABLE 1

|  | Visibility in dark environment |
| --- | --- |
| Embodiment 1 | 6.4 |
| Embodiment 2 | 6.8 |
| Embodiment 3 | 6.4 |
| Embodiment 4 | 6.4 |
| Embodiment 5 | 6.0 |
| Embodiment 6 | 5.8 |
| Embodiment 7 | 5.8 |
| Embodiment 8 | 5.4 |
| Embodiment 9 | 5.8 |
| Embodiment 10 | 4.6 |
| Embodiment 11 | 4.4 |
| Embodiment 12 | 4.2 |
| Embodiment 13 | 5.6 |
| Embodiment 14 | 6.6 |
| Embodiment 15 | 5.2 |
| Embodiment 16 | 6.6 |
| Embodiment 17 | 6.8 |
| Embodiment 18 | 6.2 |
| Comparison Example 1 | 1.2 |
| Comparison Example 2 | 1.2 |
| Comparison Example 3 | 3.4 |

As shown in Table 1, the mirror displays according to Embodiments 1 to 18 were all rated as providing better visibility of reflected images in mirror mode in dark environments than the mirror displays according to Comparison Examples 1 to 3. Moreover, the mirror displays according to Embodiments 1 to 5, 14, and 16 to 18 all received an average rating above 6, which indicates very good visibility of reflected images in mirror mode in dark environments. Meanwhile, the mirror displays according to Comparison Examples 1 and 2 were both rated as providing extremely poor visibility of reflected images in mirror mode in dark environments in comparison with the mirror displays according to the embodiments. This is due to the fact that the mirror displays according to Comparison Examples 1 and 2 do not include an auxiliary illumination unit. Furthermore, the mirror display according to Comparison Example 3 was rated as providing poor visibility of reflected images in mirror mode in dark environments in comparison with the mirror displays according to the embodiments. This is due to the fact that although the mirror display according to Comparison Example 3 includes an auxiliary illumination unit, the auxiliary illumination unit uses the light emitted from the liquid crystal display device when the liquid crystal display device is in the white display state, and therefore reflected objects cannot be illuminated with light of a greater brightness than the light emitted from the liquid crystal display device when in the white display state.

Table 2 shows the results of evaluating color rendition in mirror mode for the mirror displays according to Embodiments 10 and 15 to 18 and Comparison Example 3.

Color rendition in mirror mode was evaluated using the following method.

(1) Each mirror display was installed in a room with the illuminance set to 200 lx to recreate a normal living room environment.

(2) 5 women applied makeup products using the mirror displays, with the mirror displays set to a mirror mode meant to reproduce the ambiance of a nighttime party venue.

(3) In a room with the illuminance set to 100 lx to recreate a normal party venue environment, the 5 women rated whether their makeup applications turned out as envisioned on a 7-point scale. The rating scale was defined as follows: 1—Extremely different than envisioned, 2—Different than envisioned, 3—Somewhat different than envisioned, 4—Neutral, 5—Somewhat as envisioned, 6—As envisioned, 7—Exactly as envisioned.

(4) The results of the 5 women's evaluations were averaged to determine the color rendition of each display.

TABLE 2

|  | Color rendition |
| --- | --- |
| Embodiment 10 | 5.0 |
| Embodiment 15 | 5.6 |
| Embodiment 16 | 6.4 |
| Embodiment 17 | 6.6 |
| Embodiment 18 | 6.4 |
| Comparison Example 3 | 4.4 |

As shown in Table 2, the mirror displays according to Embodiments 10 and 15 to 18 were all rated as having better color rendition than the mirror display according to Comparison Example 3. This is because as shown in Table 1, the mirror displays according to Embodiments 10 and 15 to 18 all provided much better visibility of reflected images in mirror mode in dark environments than the mirror display according to Comparison Example 3, and therefore the former group of mirror displays exhibit higher brightness when adjusting colors as well. Moreover, the mirror displays according to Embodiments 16 to 18 all received an average rating above 6, which indicates very good color rendition.

Considering the evaluation results shown in Tables 1 and 2, the mirror displays according to Embodiments 16 to 18 exhibited both excellent visibility of reflected images in mirror mode in dark environments and excellent color rendition.

<Additional Notes>

Next, examples of preferred aspects of the first mirror display according to the present invention will be described. These examples may also be combined as appropriate within the spirit of the present invention.

The size of the display device may be the same as the size of the half mirror plate when viewed in a plan view from the viewing side. This makes it possible to make effective use of the auxiliary illumination unit even when the display region and the mirror region are the same size.

The auxiliary illumination unit may further include a light guide plate arranged on the rear side of the outer frame, and the auxiliary light source may be arranged on the rear side of the outer frame and along an edge of the light guide plate, such that the light emitted from the auxiliary light source enters the light guide plate and is then emitted towards the viewing side. In this way, the light guide plate spreads the light emitted from the auxiliary light source and then emits that light towards the viewing side, thereby making it possible to make effective use of the auxiliary illumination unit. Furthermore, using a thin light guide plate makes it possible to efficiently manufacture the mirror display without having to change any components other than the case.

The auxiliary illumination unit may further include a diffuser arranged on the viewing side of the half mirror layer, and the auxiliary light source may be arranged on the rear side of the outer frame and along an edge of the half mirror plate, such that the light emitted from the auxiliary light source enters the half mirror plate and the diffuser and is then emitted towards the viewing side. In this way, the diffuser diffuses the light emitted from the auxiliary light source and then emits that light towards the viewing side, thereby making it possible to make effective use of the auxiliary illumination unit.

The size of the display device may be smaller than the size of the half mirror plate when viewed in a plan view from the viewing side. This makes it possible to make effective use of the auxiliary illumination unit even when the display region is smaller than the mirror region. Furthermore, this makes it possible to use display mode and mirror mode at the same time, with the region outside of the display region functioning as a mirror.

The mirror display may further include a light shield arranged on the rear side of the half mirror plate and outside of the region in which the display device and the half mirror plate face one another, and an opening may be formed in the light shield, such that light emitted from the auxiliary light source passes through the opening and the half mirror plate and is then emitted towards the viewing side. This makes it possible to make effective use of the auxiliary illumination unit even when the auxiliary light source is arranged on the rear side of the half mirror plate.

The mirror display may further include a light shield arranged on the rear side of the half mirror plate and outside of the region in which the display device and the half mirror plate face one another, the auxiliary illumination unit may further include a diffuser arranged on the viewing side of the half mirror layer and outside of the region in which the display device and the half mirror plate face one another, and the auxiliary light source may be arranged on the rear side of the outer frame and along an edge of the half mirror plate, such that the light emitted from the auxiliary light source enters the half mirror plate and the diffuser and is then emitted towards the viewing side. In this way, the diffuser diffuses the light emitted from the auxiliary light source and then emits that light towards the viewing side, thereby making it possible to make effective use of the auxiliary illumination unit.

The display device may be a liquid crystal display device, and the half mirror layer may include at least one reflective polarizer. This makes it possible to achieve both good visibility of displayed images in display mode and good visibility of reflected images in mirror mode.

The half mirror layer may include at least one reflective polarizer, the display device may include (arranged in order from the half mirror plate side) a liquid crystal display panel and a backlight unit that includes a display light source, and the auxiliary light source may be arranged on the rear side of the backlight unit, such that the brightness of the auxiliary light source is greater than the brightness of the display light source. This makes it possible to make effective use of the auxiliary illumination unit even when the auxiliary light source is arranged on the rear side of the display device. Furthermore, this type of mirror display configuration in which a liquid crystal display device and a reflective polarizer are used in combination makes it possible to achieve both good visibility of displayed images in display mode and good visibility of reflected images in mirror mode.

Next, examples of preferred aspects of the second mirror display according to the present invention will be described. These examples may also be combined as appropriate within the spirit of the present invention.

The display device may include (arranged in order from the half mirror plate side) a liquid crystal display panel and a backlight unit that includes a display light source; the liquid crystal display panel may include (arranged in order from the half mirror plate side) a first polarizer, a first substrate, a liquid crystal layer, a second substrate, and a second polarizer; and the auxiliary illumination unit may include a portion of the display light sources. This makes it possible to make effective use of the auxiliary illumination unit even when the auxiliary illumination unit is part of the liquid crystal display device.

At least one of the first and the second substrates may be a color filter substrate that includes color filter layers, the color filter substrate may include a first portion in which the color filter layers are thinner than in other portions, and the auxiliary illumination unit may emit the light from the portion of the display light sources towards the viewing side through that first portion. This reduces the amount of light absorbed by the portion in which the color filter layers are thin, thereby making it possible to make effective use of the auxiliary illumination unit.

At least one of the first and the second substrates may be a color filter substrate that includes color filter layers, the color filter substrate may include a second portion in which the color filter layers are not present, and the auxiliary illumination unit may emit the light from the portion of the display light sources towards the viewing side through that second portion. In this way, light is not absorbed by the portion in which the color filter layers are not present, thereby making it possible to make effective use of the auxiliary illumination unit.

At least one of the first and the second substrates may be a color filter substrate that includes color filter layers, the color filter layers may include a third portion in which the concentration of the material used to form the color filter layers is lower than in other portions, and the auxiliary illumination unit may emit the light from the portion of the display light sources towards the viewing side through that third portion. This reduces the amount of light absorbed by the portion in which the concentration of the material used to form the color filter layers is low, thereby making it possible to make effective use of the auxiliary illumination unit.

At least one of the first and the second substrates may be a color filter substrate that includes color filter layers, the color filter substrate may include a fourth portion that includes pixels in which the color filter layers are not present as well as some pixels in which the color filter layers are present, and the auxiliary illumination unit may emit the light from the portion of the display light sources towards the viewing side through that fourth portion. In this way, light is not absorbed by the pixels in which the color filter layers are not present, thereby making it possible to make effective use of the auxiliary illumination unit.

The liquid crystal display panel may include a fifth portion in which at least one of the first and the second polarizers is not present, and the auxiliary illumination unit may emit the light from the portion of the display light sources towards the viewing side through that fifth portion. In this way, no light transmission loss occurs in the portion in which the polarizer is not present, thereby making it possible to make effective use of the auxiliary illumination unit.

The backlight unit may include a sixth portion in which more of the display light sources are arranged than in other portions, and the auxiliary illumination unit may emit the light from that sixth portion towards the viewing side. In this way, more light is emitted from the portion in which more of the display light sources are arranged, thereby making it possible to make effective use of the auxiliary illumination unit.

The backlight unit may include a seventh portion in which display light sources of colors other than white are arranged, and the auxiliary illumination unit may emit the light from that seventh portion towards the viewing side. In this way, the color of the light emitted from the portion in which display light sources of colors other than white are arranged can be adjusted, thereby making it possible to make effective use of the auxiliary illumination unit.

The size of the liquid crystal display panel may be less than the size of the backlight unit when viewed in a plan view from the viewing side, and the auxiliary illumination unit may be arranged in a region outside of the region in which the liquid crystal display panel and the backlight unit face one another. In this way, no light transmission loss occurs in the region in which the liquid crystal display panel and the backlight unit face one another, thereby making it possible to make effective use of the auxiliary illumination unit. Furthermore, this mirror display can be configured simply by preparing a liquid crystal display panel that is smaller in size than the backlight unit. Therefore, no changes need to be made to the process for manufacturing the liquid crystal display panel, which is advantageous from a production cost perspective.

The half mirror layer may include at least one reflective polarizer. This makes it possible to make effective use of the auxiliary illumination unit even when a reflective polarizer is used as the half mirror layer. Furthermore, using this type of reflective polarizer in combination with a liquid crystal display device makes it possible to achieve both good visibility of displayed images in display mode and good visibility of reflected images in mirror mode.

Next, examples of preferred aspects of the first and second mirror displays according to the present invention will be described. These examples may also be combined as appropriate within the spirit of the present invention.

The mirror displays may further include a position sensor that measures the distance to objects on the viewing side, and the auxiliary illumination unit may be connected to this position sensor to automatically adjust the brightness and color of the light from the auxiliary illumination unit. The mirror displays may further include an illuminance sensor that measures the brightness of the ambient environment, and the auxiliary illumination unit may be connected to this illuminance sensor to automatically adjust the brightness of the light from the auxiliary illumination unit. The mirror displays may further include a color sensor that measures the color tones present in the ambient environment, and the auxiliary illumination unit may be connected to this color sensor to automatically adjust the color of the light from the auxiliary illumination unit. These modifications make it possible to improve the usability of the mirror displays. Furthermore, using these types of sensors to adjust the color and brightness of the light emitted from the auxiliary illumination unit in accordance with the ambient environment makes it possible to create mirror mode effects that match the ambiance of the ambient environment.

DESCRIPTION OF REFERENCE CHARACTERS 1a, 1b, 1c, 1d, 1e, 1f, 1g, 1h, 1i, 1j, 1k, 1m, 1n, 1p, 1q, 1r, 1s, 1t, 101a, 101b, 101c mirror display
2a, 2b, 2c, 2d, 2e, 2f, 2g, 2h, 2i, 2j, 2k, 102a, 102b liquid crystal display device
3, 103 air space
4a, 4b, 104a half mirror plate
5, 105 case
6, 106 outer frame
7a, 7b, 7c, 7d, 7e, 7f, 7g, 7h, 7i, 7j, 7k, 7m, 7n, 7p, 7q, 7r, 107a auxiliary illumination unit
8a, 8b, 8c, 8d, 108a, 108b backlight unit
9W, 9W', 9R, 9G, 9B, 109W LED
10a, 10b, 10c, 110a light guide plate
11a, 11b, 11c, 11d, 11e, 11f, 11g, 11h, 111a liquid crystal display panel
12a, 12b, 112a, 112b absorptive polarizer
13, 113 thin-film transistor array substrate
14, 114 liquid crystal layer
15a, 15b, 15c, 15d, 115a color filter substrate
16R, 16R', 16G, 16G', 16B, 16B', 16W, 116R, 116G, 116B color filter layer
17a, 17b, 117a, 117b glass substrate
18, 118 reflective polarizer
19 AG film
20 diffuser
21 light shield
22 opening
23, 123 diffusion plate
24 dielectric multilayer film
AR1, AR1' display region
AR2, AR2' mirror region

What is claimed is:

1. A mirror display, comprising:
a half mirror plate including a half mirror layer;
a display device;
a case; and
an auxiliary illumination unit including an auxiliary light source,
wherein the case supports at least the half mirror plate and the display device and includes an outer frame that covers an edge of a front surface of the half mirror plate when viewed in a plan view from a viewing side,
wherein the display device is arranged on a rear side of the half mirror plate,
wherein the auxiliary light source is arranged on the rear side of the half mirror plate, the display device, or the outer frame,
wherein the display device emits display light, and the mirror display is switchable between a display mode in which the display light passes through the half mirror plate and a mirror mode in which the display device does not emit the display light,
wherein the auxiliary illumination unit is controlled separately from the display device and emits light toward the viewing side when the mirror display is in the mirror mode, and
wherein, as measured on the viewing side of the mirror display, a brightness of the light emitted from the auxiliary illumination unit is greater than a brightness of the display device when the display device is in a white display state.

2. The mirror display according to claim 1, wherein a size of the display device is the same as a size of the half mirror plate when viewed in a plane view from the viewing side.

3. The mirror display according to claim 2,
wherein the auxiliary illumination unit further includes a light guide plate arranged on the rear side of the outer frame,
wherein the auxiliary light source is arranged on the rear side of the outer frame and along an edge of the light guide plate, and
wherein the light emitted from the auxiliary light source enters the light guide plate and is then emitted towards the viewing side.

4. The mirror display according to claim 2,
wherein the auxiliary illumination unit further includes a diffuser arranged on the viewing side of the half mirror layer,
wherein the auxiliary light source is arranged on the rear side of the outer frame and along an edge of the half mirror plate; and
wherein the light emitted from the auxiliary light source enters the half mirror plate and the diffuser and is then emitted towards the viewing side.

5. The mirror display according to claim 1, wherein a size of the display device is less than a size of the half mirror plate when viewed in the plan view from the viewing side.

6. The mirror display according to claim 5, further comprising:
a light shield arranged on the rear side of the half mirror plate and outside of a region in which the display device and the half mirror plate face one another,
wherein an opening is formed in the light shield, and
wherein the light emitted from the auxiliary light source passes through the opening and the half mirror plate and is then emitted towards the viewing side.

7. The mirror display according to claim 5, further comprising:
a light shield arranged on the rear side of the half mirror plate and outside of a region in which the display device and the half mirror plate face one another,
wherein the auxiliary illumination unit further includes a diffuser arranged on the viewing side of the half mirror layer and outside of the region in which the display device and the half mirror plate face one another, wherein the auxiliary light source is arranged on the rear side of the outer frame and along an edge of the half mirror plate, and wherein the light emitted from the auxiliary light source enters the half mirror plate and the diffuser and is then emitted towards the viewing side.

8. The mirror display according to claim 1, wherein the display device is a liquid crystal display device, and wherein the half mirror layer includes at least one reflective polarizer.

9. The mirror display according to claim 2, wherein the half mirror layer includes at least one reflective polarizer, wherein the display device includes, arranged in order from the half mirror plate, a liquid crystal display panel and a backlight unit that includes a display light source, wherein the auxiliary light source is arranged on the rear side of the backlight unit, and wherein a brightness of the auxiliary light source is greater than a brightness of the display light source.

10. The mirror display according to claim 1, further comprising:

a position sensor that measures a distance to objects on the viewing side, wherein the auxiliary illumination unit automatically adjusts brightness and color in conjunction with the position sensor.

11. The mirror display according to claim 1, further comprising:

an illuminance sensor that measures a brightness of an ambient environment, wherein the auxiliary illumination unit automatically adjusts brightness in conjunction with the illuminance sensor.

12. The mirror display according to claim 1, further comprising:

a color sensor that measures color tones present in an ambient environment, wherein the auxiliary illumination unit automatically adjusts color in conjunction with the color sensor.

13. The mirror display according to claim 1, wherein the half mirror plate, the display device, or the outer frame overlaps the auxiliary light source when viewed in a plan view from a viewing side.

14. A mirror display comprising:

a half mirror plate that includes a half mirror layer; and a display device;

wherein the display device emits display light, and the mirror display is switchable between a display mode in which the display light passes through the half mirror plate and a mirror mode in which the display device does not emit the display light, wherein the display device includes an auxiliary illumination unit that is arranged on the rear side of the half mirror plate and that emits light towards a viewing side when the mirror display is in the mirror mode, and wherein, as measured on the viewing side of the mirror display, a brightness of the light emitted from the auxiliary illumination unit is greater than a brightness of the display device when the display device is in a white display state.

15. The mirror display according to claim 14, wherein the display device includes, arranged in order from the half mirror plate, a liquid crystal display panel and a backlight unit that includes a display light source, wherein the liquid crystal display includes, arranged in order from the half mirror plate, a first polarizer, a first substrate, a liquid crystal layer, a second substrate, and a second polarizer, and wherein the auxiliary illumination unit includes a part of the display light source.

16. The mirror display according to claim 15, wherein at least one of the first and the second substrates in a color filter substrate that includes a color filter layer, wherein the color filter substrate includes a portion in which the color filter layer is thinner than in other portions, and wherein the auxiliary illumination unit emits light from the part of the display light source towards the viewing side through said portion of the color filter substrate.

17. The mirror display according to claim 15, wherein at least one of the first and the second substrates is a color filter substrate that includes a color filter layer, wherein the color filter substrate includes a portion in which the color filter layer is not present, and wherein the auxiliary illumination unit emits light from the part of the display light source towards the viewing side through said portion of the color filter substrate.

18. The mirror display according to claim 15, wherein at least one of the first and the second substrates in a color filter substrate that includes a color filter layer, wherein the color filter layer includes a portion in which a concentration of a material used to form the color filter layer is lower than in other portions, and wherein the auxiliary illumination unit emits light from the part of the display light source towards the viewing side through said portion of the color filter layer.

19. The mirror display according to claim 15, wherein at least one of the first and the second substrates is a color filter substrate that includes a color filter layer, wherein the color filter substrate includes a portion constituted by pixels in which the color filter layer is not present and pixels in which the color filter layer is present, and wherein the auxiliary illumination unit emits light from the part of the display light source towards the viewing side through said portion of the color filter substrate.

20. The mirror display according to claim 15, wherein the liquid crystal display panel includes a portion in which at least one of the first and second polarizers is not present, and wherein the auxiliary illumination unit emits light from the part of the display light source towards the viewing side through said portion of the liquid crystal display panel.

21. The mirror display according to claim 15, wherein the backlight unit includes a portion in which more of the display light sources are arranged than in other portions, and wherein the auxiliary illumination unit emits light from said portion of the backlight unit towards the viewing side.

22. The mirror display according to claim 16, wherein the backlight unit includes a portion in which the display light sources of colors other than white are arranged, and wherein the auxiliary illumination unit emits light from said portion of the backlight unit towards the viewing side.

23. The mirror display according to claim 15,
wherein a size of the liquid crystal display panel is less than a size of the backlight unit when viewed in a plan view from the viewing side, and
wherein the auxiliary illumination unit is arranged in a region outside of a region in which the liquid crystal display panel and the backlight unit face one another.

24. The mirror display according to claim 14,
wherein the half mirror layer includes at least one reflective polarizer.

25. The mirror display according to claim 14, wherein the half mirror plate overlaps the auxiliary light source when viewed in a plan view from a viewing side.

* * * * *